US012591858B2

(12) United States Patent　　　　　(10) Patent No.: US 12,591,858 B2
Ries et al.　　　　　　　　　　　　　(45) Date of Patent:　Mar. 31, 2026

(54) TURF MAINTENANCE SYSTEM AND METHODS

(71) Applicant: THE TORO COMPANY, Minneapolis, MN (US)

(72) Inventors: Brian E. Ries, Bloomington, MN (US); Jamie J. Feldman, Vadnais Heights, MN (US); Tony L. Ferguson, Chanhassen, MN (US); Richard D. Gerhardson, Bloomington, MN (US)

(73) Assignee: The Toro Company, Minneapolis, MN (US)

( * ) Notice: Subject to any disclaimer, the term of this patent is extended or adjusted under 35 U.S.C. 154(b) by 175 days.

(21) Appl. No.: 18/000,088

(22) PCT Filed: May 28, 2021

(86) PCT No.: PCT/US2021/034910
§ 371 (c)(1),
(2) Date: Nov. 28, 2022

(87) PCT Pub. No.: WO2021/243243
PCT Pub. Date: Dec. 2, 2021

(65) Prior Publication Data
US 2023/0214788 A1　　Jul. 6, 2023

Related U.S. Application Data

(60) Provisional application No. 63/031,390, filed on May 28, 2020.

(51) Int. Cl.
*G06Q 10/20*　　　(2023.01)

(52) U.S. Cl.
CPC ..................................... *G06Q 10/20* (2013.01)

(58) Field of Classification Search
CPC .............................. G06Q 50/02; G06Q 10/20
See application file for complete search history.

(56) References Cited

U.S. PATENT DOCUMENTS

| | | | |
|---|---|---|---|
| 9,661,453 B2 | 5/2017 | Langberg | |
| 2003/0088534 A1* | 5/2003 | Kalantar | .......... G06Q 10/06311 |
| | | | 706/50 |
| 2004/0225412 A1 | 11/2004 | Alexanian | |
| 2014/0013252 A1 | 1/2014 | Ehrler et al. | |

(Continued)

FOREIGN PATENT DOCUMENTS

| | | | |
|---|---|---|---|
| EP | 2710884 B1 * | 5/2018 | ............. A01G 20/30 |
| WO | 2015/007740 A1 | 1/2015 | |

OTHER PUBLICATIONS

Kushwaha, Dilip & Sahoo, P.K. & Pradhan, Nrusingh & Makwana, Yash & Mani, Indra, "Robotics Application in Agriculture". 55 Annual Convention of Indian Society of Agricultural Engineers and International Symposium (Jun. 2022) (Year : 2022).*

(Continued)

*Primary Examiner* — Andrew Chase Lakhani
(74) *Attorney, Agent, or Firm* — Merchant & Gould P.C.

(57)　　　　　　ABSTRACT

A turf maintenance system acquires data from one or more turf systems, generates a dashboard display screen to display the data acquired from the one or more turf systems, and schedules tasks for completing a turf maintenance job based on the acquired data.

18 Claims, 12 Drawing Sheets

(56) References Cited

U.S. PATENT DOCUMENTS

| | | | | | |
|---|---|---|---|---|---|
| 2014/0032033 | A1* | 1/2014 | Einecke | ................. | G06V 20/10 |
| | | | | | 701/27 |
| 2014/0117892 | A1* | 5/2014 | Coates | ...................... | H02P 7/06 |
| | | | | | 318/494 |
| 2015/0058062 | A1* | 2/2015 | Mejegard | .................. | G01P 3/00 |
| | | | | | 705/7.42 |
| 2015/0234385 | A1* | 8/2015 | Sandin | .................. | B60L 3/0023 |
| | | | | | 901/1 |
| 2015/0302328 | A1* | 10/2015 | Zeng | ............... | G06Q 10/06398 |
| | | | | | 705/7.38 |
| 2015/0309496 | A1* | 10/2015 | Kah, III | ............. | G05B 19/0426 |
| | | | | | 700/284 |
| 2016/0157422 | A1 | 6/2016 | Köhler et al. | | |
| 2016/0165795 | A1* | 6/2016 | Balutis | ................. | G05D 1/0044 |
| | | | | | 701/25 |
| 2016/0195876 | A1 | 7/2016 | Mattsson et al. | | |
| 2017/0076256 | A1* | 3/2017 | Castel | .............. | G06Q 10/06311 |
| 2017/0323236 | A1* | 11/2017 | Quintavalla | .......... | G06T 11/206 |
| 2018/0174091 | A1 | 6/2018 | Aspromonte et al. | | |
| 2018/0199525 | A1 | 7/2018 | Cline et al. | | |
| 2018/0213731 | A1* | 8/2018 | Wykman | .............. | A01C 21/007 |
| 2019/0230850 | A1* | 8/2019 | Johnson | ................. | B65G 67/02 |
| 2019/0370917 | A1 | 12/2019 | Vanslette et al. | | |
| 2021/0114614 | A1* | 4/2021 | Weslosky | ........... | G06F 11/0793 |
| 2023/0397525 | A1* | 12/2023 | Lee | ...................... | A01D 34/008 |

OTHER PUBLICATIONS

Prasad et al, "Autonomous Lawn Mower", Indo-American Journal of Mechanical Engineering. vol 14, Issue 2, pp. 68-72 (Apr. 2025) (Year: 2025).*
International Search Report and Written Opinion for PCT/US2021/034910 (Oct. 13, 2021).
European Patent Office; Extended European Search Report (EESR) for Application No. 21813827.9 mailed on Jul. 3, 2024, 7 pages.

* cited by examiner

600

700

702

Receive Observed Issue

704

Receive Location of Observed Issue

706

Generate Task

900

902
Acquire Data

904
Generate Dashboard Display Screen

906
Schedule Task

908
Adjust Scheduled Task

1000

1002

Acquire Data

1004

Generate Dashboard Display Screen

1006

Adjust Scheduled Task

TURF MAINTENANCE SYSTEM AND METHODS

This application is a National Stage Application of PCT International Patent application No. PCT/US2021/034910, filed May 28, 2021, which claims the benefit of and priority to U.S. Provisional patent application Ser. No. 63/031,390, filed May 28, 2200, which applications are incorporated herein by reference in their entireties. To the extent appropriate, a claim of priority is made to each of the above-disclosed applications.

This application is being filed on May 28, 2021, as a PCT International Patent application and claims the benefit of and priority to U.S. Provisional patent application Ser. No. 63/031,390, filed May 28, 2020, the entire disclosure of which is incorporated by reference in its entirety.

BACKGROUND

Turf is a ground covering for a variety of recreational and non-recreational purposes. In the context of a golf course, turf varies among the teeing area, fairway, putting green, rough and other hazards for each hole of the golf course.

A variety of factors can influence the needs of the turf at any given location. For example, the turf in one location, such as a fairway of a golf course, may require certain maintenance that varies from the maintenance of other turf sites. To account for such variances, it is often necessary to identify the different areas of turf and assign various tasks to maintenance crews for managing each area of the turf as appropriate.

Challenges in turf management include the need to acquire accurate and relevant information in order to inform better management decisions, and to thereby improve the quality and efficiency of turf management. Additionally, it can be challenging to find and retain qualified and motivated labor. For these and other reasons, improvements are needed.

SUMMARY

In general terms, this disclosure relates to turf maintenance systems and methods.

In one aspect, a turf maintenance system comprises: at least one processing device; and at least one memory device storing software instructions that, when executed by the at least one processing device, cause the at least one processing device to: acquire data from one or more turf systems; generate a dashboard display screen to display the data acquired from the one or more turf systems; and schedule at least one task for completing a turf maintenance job based on the data acquired from the one or more turf systems.

In another aspect, a turf maintenance system comprises: at least one processing device; and at least one memory device storing software instructions that, when executed by the at least one processing device, cause the system to: acquire data on an area within a turf site from one or more of a weather service system, a task management system, an asset tracking system, an irrigation system, and turf devices installed at the turf site; generate a dashboard display screen to display the data on the area within the turf site acquired from one or more of the weather service system, the task management system, the asset tracking system, the irrigation system, and the devices installed at the turf site; and adjust a scheduled task for the area within the turf site based on the acquired data.

In another aspect, a method is described for determining breaks in play to permit a task to be completed in an area of a turf site, the method comprising: estimating a time needed to complete the task; monitoring visitor locations on the turf site; estimating a time for a break in play based on the monitored visitor locations; determining whether the estimated time for the break in play is greater than the estimated time to complete the task; and when the estimated time for the break in play is greater than the estimated time to complete the task, instructing a maintenance person or autonomous equipment to perform the task during the break in play.

In another aspect, a method is described for generating scheduled tasks based on inputs received from a maintenance person while performing a turf maintenance job, the method comprising: receiving a turf-related issue observed by the maintenance person, the turf-related issue received from a maintenance interface used by a maintenance person; receiving a location of the turf-related issue from the maintenance interface; and scheduling a task based on the turf-related issue and location.

In another aspect, a method for enforced maintenance personnel messaging, the method comprising: sending a scheduled task from a control interface operated by a site supervisor to a maintenance interface operated by a maintenance person; determining whether an acknowledgment of compliance is received from the maintenance person; and when acknowledgment of compliance is not received, escalating the scheduled task to enforce compliance with the scheduled task.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

DESCRIPTION OF THE FIGURES

The following drawing figures, which form a part of this application, are illustrative of described technology and are not meant to limit the scope of the disclosure in any manner.

DETAILED DESCRIPTION

Figure 1:
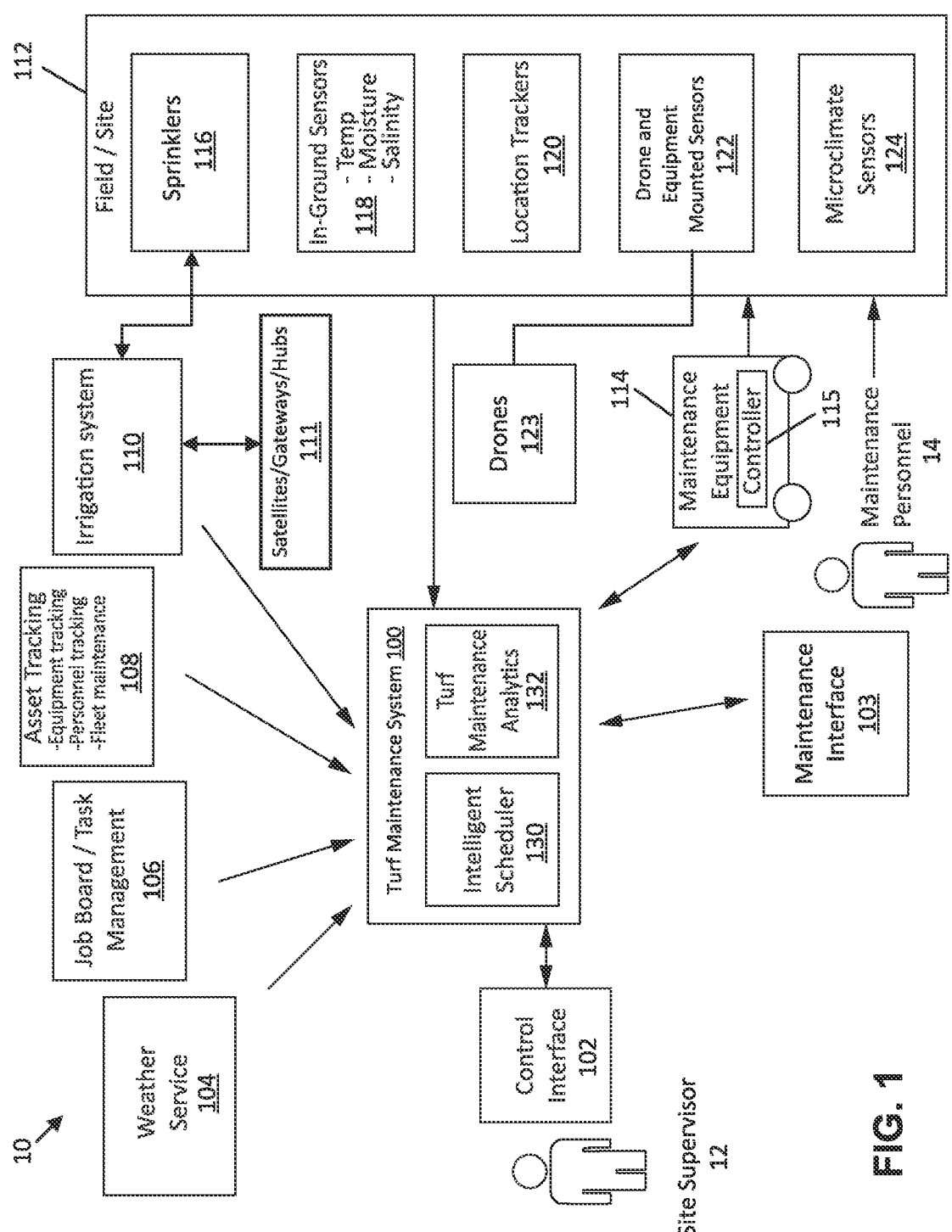
FIG. 1 is a schematic diagram of an example turf maintenance system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 schematically illustrates a turf site 10 where a turf maintenance system 100 is utilized by a site supervisor 12 to schedule tasks performed by maintenance personnel 14 for a turf maintenance job. As described herein, a turf maintenance job includes one or more distinct tasks performed by the maintenance personnel 14 for managing the turf site 10 such as mowing, trimming, removing debris such as leaves and grass cuttings, and so on. While only one maintenance person 14 is shown in FIG. 1, a plurality of maintenance personnel 14 can simultaneously work at the turf site 10 to complete a turf maintenance job.

Additionally, while certain examples described herein refer to the turf site 10 as a golf course having a plurality of holes, the turf maintenance system 100 can be used to manage a variety of turf sites. For example, in addition to managing a golf course, the turf maintenance system 100 can be used to manage, without limitation, ball playing fields such as baseball fields, football fields, and soccer fields, as well as parks, gardens, lawns, grounds, and the like.

The turf maintenance system 100 retrieves data from one or more turf systems such as a weather service system 104, a task management system 106, an asset tracking system 108, an irrigation system 110, and one or more turf devices 112. Advantageously, the turf maintenance system 100 interacts with the various turf systems and devices to provide new and improved functionality. For example, data from one turf system or device can be used by the turf maintenance system 100 to control or adjust the operation of another turf system or device. Any combination of turf systems and devices can work together to provide functionality that is not available for the individual turf systems and devices on their own.

In certain embodiments, the weather service system 104, task management system 106, asset tracking system 108, irrigation system 110, and turf devices 112 are operated by a common entity such as an owner of the turf site 10 or the site supervisor 12. Alternatively, the weather service system 104, task management system 106, asset tracking system 108, irrigation system 110, and turf devices 112 can be independently operated by different entities such as contractors or sub-contractors hired by the owner of the turf site 10 or the site supervisor 12.

The task management system 106 includes data that identifies various tasks that are required for a turf maintenance job for the turf site 10. For example, the task management system 106 includes data that identifies tasks such as mowing, trimming, removing debris, applying fertilizer, irrigating, and the like. In some instances, the various tasks are identified as being required for certain areas within the turf site 10. In some further examples, the task management system 106 identifies default maintenance personnel 14 and maintenance equipment 114 for performing the various tasks that are required for a turf maintenance job.

The turf maintenance system 100 includes an intelligent scheduler 130 that utilizes the data acquired from one or more of the weather service system 104, task management system 106, asset tracking system 108, irrigation system 110, and turf devices 112 to optimize the scheduling of tasks to improve the quality and efficiency of a turf maintenance job. For example, the intelligent scheduler 130 can assist the site supervisor 12 in scheduling tasks based on data received from at least one of the weather service system 104, the task management system 106, the asset tracking system 108, the irrigation system 110, and the turf devices 112.

As an illustrative example, a start time, an end time, a duration, or a location of a task is scheduled based on data received from at least one of the weather service system 104, the task management system 106, the asset tracking system 108, the irrigation system 110, and the turf devices 112, or a combination of one or more of these systems and devices. Additionally, certain maintenance personnel 14 and maintenance equipment 114 can be assigned to specific tasks based on data received from at least one of the weather service system 104, the task management system 106, the asset tracking system 108, the irrigation system 110, and the turf devices 112, or a combination of one or more of these systems and devices.

The turf maintenance system 100 retrieves data from the systems and devices to generate a dashboard display screen such as a control interface 102 that can be used by the site supervisor 12 to assign scheduled tasks to the maintenance personnel 14 for completion of a turf maintenance job. The control interface 102 is generated on a display device used by the site supervisor 12 such as on a smartphone, portable tablet computer, or desktop computer.

The turf maintenance system 100 further generate a dashboard display screen such as a maintenance interface 103 to notify each maintenance person 14 of their assigned scheduled tasks, and to provide updates on the assigned scheduled tasks based on the data acquired from the weather service system 104, the task management system 106, the asset tracking system 108, the irrigation system 110, and the turf devices 112 installed at the turf site 10. The maintenance interface 103 can notify each maintenance person 14 of changes to a start time, an end time, a duration, or a location for an assigned scheduled task, as well as a cancelation of an assigned scheduled task or an assignment of different maintenance equipment 114 for the scheduled task.

The maintenance interface 103 is generated on a mobile display device utilized by a maintenance person 14 such as a smartphone or tablet computer, or a display device 148 (see FIG. 11) mounted on maintenance equipment 114 used by the maintenance person 14. In some embodiments, the maintenance interface 103 functions are split or shared between multiple display devices such as between a mobile display device (i.e., a smartphone or tablet computer) and a display device 148 mounted on the maintenance equipment 114.

The maintenance personnel 14 utilize the maintenance equipment 114 to complete the scheduled tasks for the turf maintenance job. The maintenance equipment 114 can include, without limitation, mowers, string trimmers, hedge trimmers, blowers, chainsaws, snow blowers, and the like. In some instances, the maintenance equipment 114 includes autonomous equipment such as autonomous mowers that operate without human control.

Each of the maintenance equipment 114 is equipped with a controller 115 that wirelessly communicates with the turf maintenance system 100 such that the turf maintenance system 100 can retrieve data directly from the maintenance equipment 114 while being operated by a maintenance person 14. Additionally, in some embodiments, the controllers 115 wirelessly communicate with the one or more turf devices 112 installed at the turf site 10 to provide improved coordination between the maintenance equipment 114 and the turf devices 112.

Additionally, the turf maintenance system 100 includes a turf maintenance analytics engine 132 that uses the data acquired from the above-identified systems and devices to identify areas for improving the quality and efficiency of a turf maintenance job. The turf maintenance analytics engine 132 uses historical data acquired for a given area within the turf site 10 as well as a current status of the given area to determine whether improvements in a turf maintenance job are needed, how to implement said improvements, and whether resources such as the maintenance personnel 14 and maintenance equipment 114 are being used efficiently for that given area. In certain embodiments, the turf maintenance analytics engine 132 identifies the best qualified maintenance person 14 and maintenance equipment 114 for performing a scheduled task for a given area within the turf site 10, or conversely, identifies the least qualified or least efficient maintenance person 14 and maintenance equipment 114. The historical data and current status of an area within the turf site 10 are acquired from the one or more turf devices 112 installed at the turf site 10, as well as one or more of the weather service system 104, the task management system 106, the asset tracking system 108, and the irrigation system 110.

The turf devices 112 installed at the turf site 10 include sprinklers 116, in-ground sensors 118, location trackers 120, drone and equipment mounted sensors 122, and microclimate sensors 124. Additional types of devices can be installed at the turf site 10 as desirable. Also, the turf site 10 can have fewer installed devices such that at least some of the turf devices 112 are optional.

In certain embodiments, the sprinklers 116 are controlled by the irrigation system 110. For example, the sprinklers 116 can be configured to wirelessly communicate with the irrigation system 110 to receive instructions from the irrigation system 110 to irrigate an area of the turf site 10 at a specific time and for a specific duration. Additionally, the sprinklers 116 can send data to the irrigation system 110 such as to confirm that the irrigation of a given area in the turf site 10 is in progress, or has been completed. Additionally, the sprinklers 116 can communicate to the irrigation system 110 a malfunction that requires repair.

In certain embodiments, the irrigation system 110 uses satellites/gateways/hubs 111 to effectively distribute communication to and from the sprinklers 116 and turf maintenance system 100. The functionality of the satellites/gateways/hubs 111 can also be expanded to help facilitate the communication requirements of the asset tracking system 108 and other data sources.

Advantageously, the turf maintenance system 100 improves the coordination between the irrigation system 110 and the maintenance personnel 14 while performing scheduled tasks. For example, the start time for irrigating a given area of the turf site 10 can be delayed until mowing performed by a maintenance person 14 in the given area is completed. In some embodiments, the location trackers 120 can be utilized to monitor the location of the maintenance personnel 14 and maintenance equipment 114 so that a message can be sent to the maintenance personnel 14 to avoid an area that is being irrigated. Alternatively, the turf maintenance system 100 can automatically turn off the sprinklers 116 in an area where the maintenance personnel

14 and maintenance equipment 114 are detected as being located, and can turn the sprinklers 116 back on when the maintenance personnel 14 and maintenance equipment 114 leave the area.

The turf maintenance system 100 can be used to prepare a given area within the turf site 10 for future maintenance activities. For example, the turf maintenance system 100 can instruct the irrigation system 110 to irrigate or not irrigate a given area depending on the scheduled tasks and the weather forecast. For example, the turf maintenance system 100 can instruct the irrigation system 110 to thoroughly water a given area before the area is aerated.

Additionally, the turf maintenance system 100 can coordinate a chemical application task performed by a maintenance person 14 with irrigation performed by the irrigation system 110 such that a given area of the turf site is irrigated only after the chemical application task has been completed to improve the effectiveness of the chemical application. As another example, the irrigation of the given area by the irrigation system 110 can be delayed for a predetermined amount of time after the chemical application task is completed to allow the chemical to dry. As a further example, the turf maintenance system 100 can coordinate the irrigation performed by the irrigation system 110 such that the irrigation of an area within the turf site 10 terminates before a predicted arrival time of users and patrons of the turf site 10.

The in-ground sensors 118 provide data relevant to the conditions of an area within the turf site 10. The in-ground sensors 118 can include temperature sensors, moisture sensors, salinity sensors, and the like. Low moisture or high salinity detected in an area of the turf site 10 can indicate that the area is in danger of deterioration. The turf maintenance system 100 can use this data to schedule and/or adjust one or more tasks to improve the condition of the area.

The location trackers 120 are used by the turf maintenance system 100 to monitor the location of the maintenance personnel 14 and maintenance equipment 114 within the turf site 10 during performance of a turf maintenance job. The location trackers 120 can be mounted to the maintenance equipment 114 that are used by the maintenance personnel 14. Additionally, location trackers 120 can be mounted on devices used by the users and patrons of the turf site 10 (e.g., a golf club bag or golf cart) to monitor their location on the turf site 10.

The drone and equipment mounted sensors 122 can include one or more types of sensors mounted on drones 123 that provide aerial images of the turf site 10. For example, the sensors mounted on the drones 123 can provide color images, thermal images, and normalized difference vegetation index (NDVI) images to provide data on the condition of the areas of the turf site 10. When data from the images collected by the drones 123 indicates that an area of the turf site 10 is deteriorating, the turf maintenance system 100 can schedule new tasks and/or adjust one or more scheduled tasks to improve the condition of the area.

The drone and equipment mounted sensors 122 can further include one or more types of sensors mounted on the maintenance equipment 114 that provide images and data during the operation of the maintenance equipment 114 on the turf site 10. As an illustrative example, an NDVI imager can be mounted on a mower to obtain NDVI images while the mower is mowing an area of the turf site 10. As another illustrative example, a mower can be equipped with a clipping measurement sensor that measures the amount of the clippings to determine areas of the turf site 10 that have low turf growth or too much turf growth.

The microclimate sensors 124 can detect microclimate and weather characteristics of a given area within the turf site 10 at a higher level of granularity than the data acquired from the weather service system 104. For example, each hole of a golf course may each experience a unique microclimate. As a further illustrative example, a hole located next to the ocean will experience stronger wind gusts and higher levels of humidity than another hole of the same golf course that is located inland. Thus, the microclimate sensors 124 can detect a microclimate for a particular hole of a golf course or for a given area within the particular hole.

Figure 2:
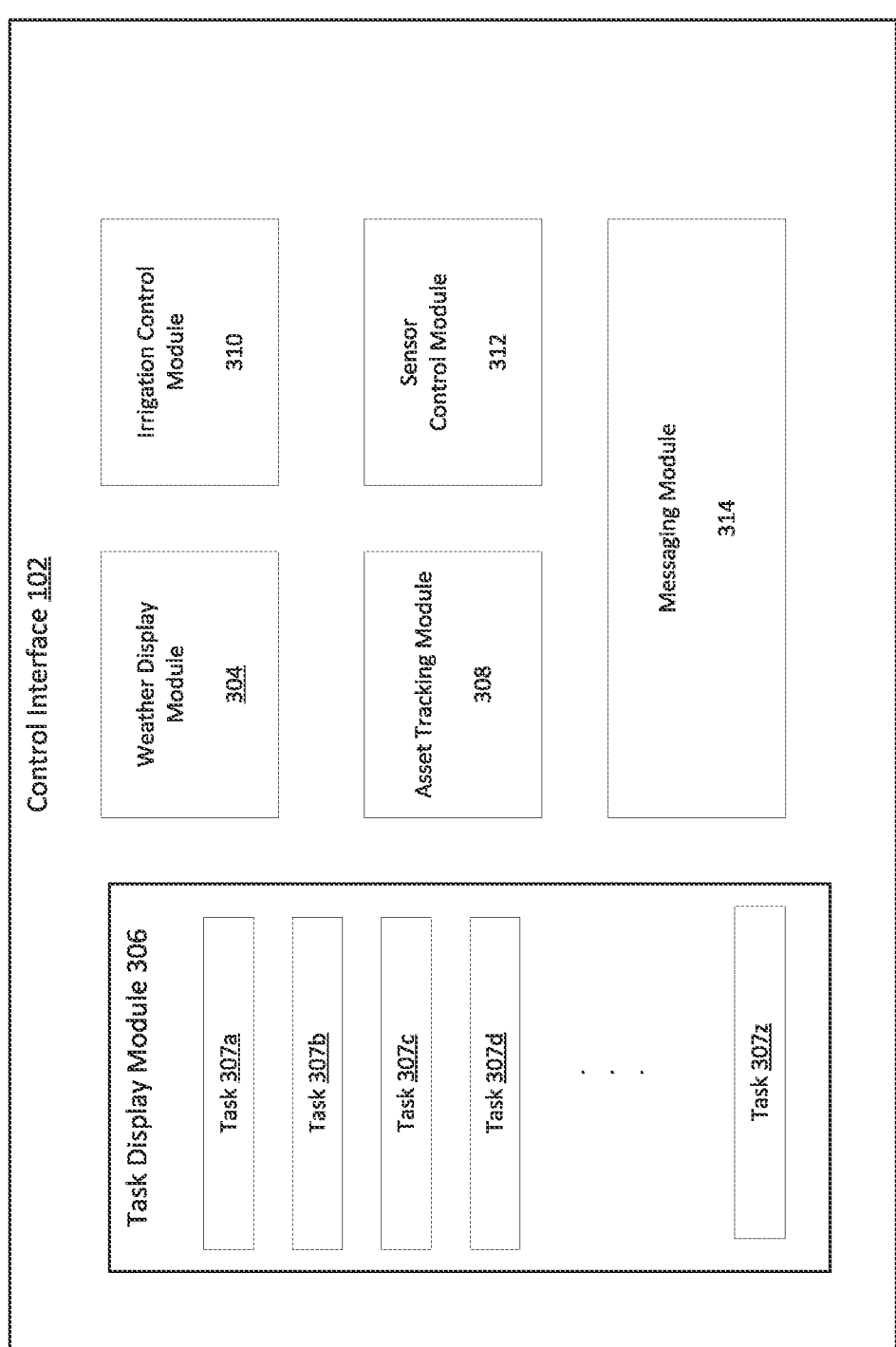
FIG. 2 is a schematic diagram of an example control interface.

FIG. 2 schematically illustrates the control interface 102. As described above, the control interface 102 is an example of a dashboard display screen generated by the turf maintenance system 100 from data acquired from one or more of the weather service system 104, task management system 106, asset tracking system 108, irrigation system 110, and the one or more turf devices 112. The control interface 102 includes customizable display modules 304-314 that can be moved, resized, rearranged, turned on/off, and expanded to show more details.

In certain embodiments, the turf maintenance system 100 provides a single sign-on access for the control interface 102, and the customizable display modules 304-314 provided inside the control interface 102. In some embodiments, the customizable display modules 304-314 are populated with the data acquired from the weather service system 104, the task management system 106, the asset tracking system 108, the irrigation system 110, and the turf devices 112 such that the single sign-on provides a user such as the site supervisor 12 access not only to the control interface 102, but also to the weather service system 104, task management system 106, asset tracking system 108, irrigation system 110, and turf devices 112.

The control interface 102 includes a task display module 306 that enables a user such as the site supervisor 12 to add, remove, or adjust scheduled tasks 307a-307z for a turf maintenance job based on data from one or more of the weather service system 104, task management system 106, asset tracking system 108, irrigation system 110, and turf devices 112. In some embodiments, the task display module 306 enables the site supervisor 12 to manually add, remove, or adjust the scheduled tasks 307, while in other embodiments, the task display module 306 can automatically add, remove, or adjust the scheduled tasks 307 based on the data from one or more of the weather service system 104, task management system 106, asset tracking system 108, irrigation system 110, and turf devices 112. In some further embodiments, the task display module 306 provides a recommendation for adding, removing, or adjusting a scheduled task 307 that the site supervisor can accept or reject by using the control interface 102.

The site supervisor 12 can select a scheduled task 307 in the task display module 306 to expand the scheduled task 307 to view more detailed information. When in the expanded view, the site supervisor 12 can adjust the scheduled task 307 by assigning a different maintenance person 14 or maintenance equipment 114 to perform the scheduled task 307, or adjusting the start time, end time, duration, or location of the scheduled task 307.

As an illustrative example, a scheduled task 307 for mowing an area within the turf site 10 is automatically adjusted by the turf maintenance system 100 or is manually adjusted by the site supervisor 12 when it is determined from the weather service system 104 that there is a high likelihood for rain in the area where the mowing is to be done, or the irrigation system 110 indicates that the area is currently being irrigated by one or more sprinklers 116.

As a further illustrative example, a new scheduled task 307 is automatically scheduled by the turf maintenance system 100 or is manually scheduled by the site supervisor 12 when it is determined that the scheduled task 307 is needed such as based on data acquired from one or more of the in-ground sensors 118, drone and equipment mounted sensors 122, and the microclimate sensors 124.

The control interface 102 can further include a weather display module 304 that displays data acquired from the weather service system 104. The data from the weather service system 104 can include current and predicted future weather conditions for the turf site 10.

The weather display module 304 can display the current or predicted future weather conditions for the turf site 10. In certain embodiments, the user can select the weather display module 304 to expand it, and view more detailed weather information. For example, the weather display module 304 can display a limited amount of weather data inside the control interface 102 (e.g., a current temperature and whether it is sunny, cloudy, or raining), and can provide more detailed weather data when expanded by the user such as a 7-day forecast, humidity, wind conditions, dew point temperature, UV index, atmospheric pressure, visibility, and the like.

The control interface 102 can further include an asset tracking module 308 that displays data acquired from the asset tracking system 108. The asset tracking system 108 can store data such as maintenance equipment 114 location and availability data, and maintenance personnel 14 work schedules, vacation schedules, and sick leave, and user locations on the turf site 10.

The asset tracking module 308 can display the availability of the maintenance personnel 14 and maintenance equipment 114. For example, a maintenance person 14 is unavailable when out on sick leave or vacation. As another example, maintenance equipment 114 is unavailable when being used, or undergoing repairs or refueling.

The asset tracking module 308 can also display the status of the maintenance personnel 14 and maintenance equipment 114 such as whether the maintenance personnel 14 is currently performing a task, and whether the maintenance equipment 114 is currently being used. The asset tracking module 308 can also display data from the location trackers 120 to display the location of the maintenance personnel 14 and maintenance equipment 114 on the turf site 10 such as by displaying a map of the turf site 10, and displaying an icon representing the location of the maintenance personnel 14 or maintenance equipment 114 on the map.

The control interface 102 can further include an irrigation control module 310 that displays data acquired from the irrigation system 110, and that enables the user to control the operation of the irrigation system 110 through the control interface 102. The data from the irrigation system 110 can include the identities and locations of the sprinklers 116 in the turf site 10, the status of the sprinklers 116 (i.e., whether being operated or at rest), and scheduling for the sprinklers 116 (i.e., start time, end time, and duration for scheduling the sprinklers 116 to run).

The irrigation control module 310 enables the user to manually adjust the operation of the sprinklers 116. Alternatively, the irrigation control module 310 can automatically adjust the operation of the sprinklers 116 based on data from the weather service system 104, task management system 106, asset tracking system 108, irrigation system 110, and turf devices 112.

The site supervisor 12 can select the irrigation control module 310 to expand it, and thereby view more detailed information of the irrigation system 110. For example, the irrigation control module 310 when expanded can enable the site supervisor 12 to disable or adjust the schedule of a sprinkler 116 or a subset of the sprinklers 116 installed in the turf site 10. The irrigation control module 310 enables the site supervisor 12 to control a single sprinkler or a subset of the sprinklers to provide more granular control of the irrigation system 110 that can be adjusted based on the needs of a given area within the turf site 10.

The control interface 102 includes a sensor control module 312 that displays data from one or more of the turf devices 112 installed at the turf site 10, and that enables the user to control the operation of the turf devices 112. The sensor control module 312 enables the user to manually adjust the operation of the turf devices 112. Alternatively, the sensor control module 312 can automatically adjust the operation of the turf devices 112 based on data from the weather service system 104, task management system 106, asset tracking system 108, irrigation system 110, and turf devices 112.

The site supervisor 12 can select the sensor control module 312 to expand it, and thereby view more detailed sensor data. The data displayed in the sensor control module 312 can include the temperature, moisture, and salinity for a given area of the turf site 10 detected by the in-ground sensors 118, the data acquired from the drone and equipment mounted sensors 122, and the microclimate data acquired from the microclimate sensors 124. In some instances, the data is displayed on a map overlay of the turf site 10.

Still referring to FIG. 2, the control interface 102 further includes a messaging module 314 that enables the user such as the site supervisor 12 to send messages to the maintenance personnel 14, and to receive messages from the maintenance personnel 14. Advantageously, the messaging module 314 can enhance the coordination between the site supervisor 12 and the maintenance personnel 14 during performance of a turf maintenance job. Illustrative examples of the messaging between the site supervisor 12 and maintenance personnel 14 include the site supervisor 12 messaging an assignment of a task to the maintenance personnel 14, an update to a previously assigned task, weather warnings, an instruction to call the site supervisor 12, and the like. Additionally, the messaging module 314 can automatically translate a message from the site supervisor into another language for improved communication between the site supervisor 12 and the maintenance personnel 14. For example, the messaging module 314 can automatically translate a message from the site supervisor 12 in English into Spanish, and then relay the message in Spanish to the maintenance personnel 14 for improved communication.

Figure 3:
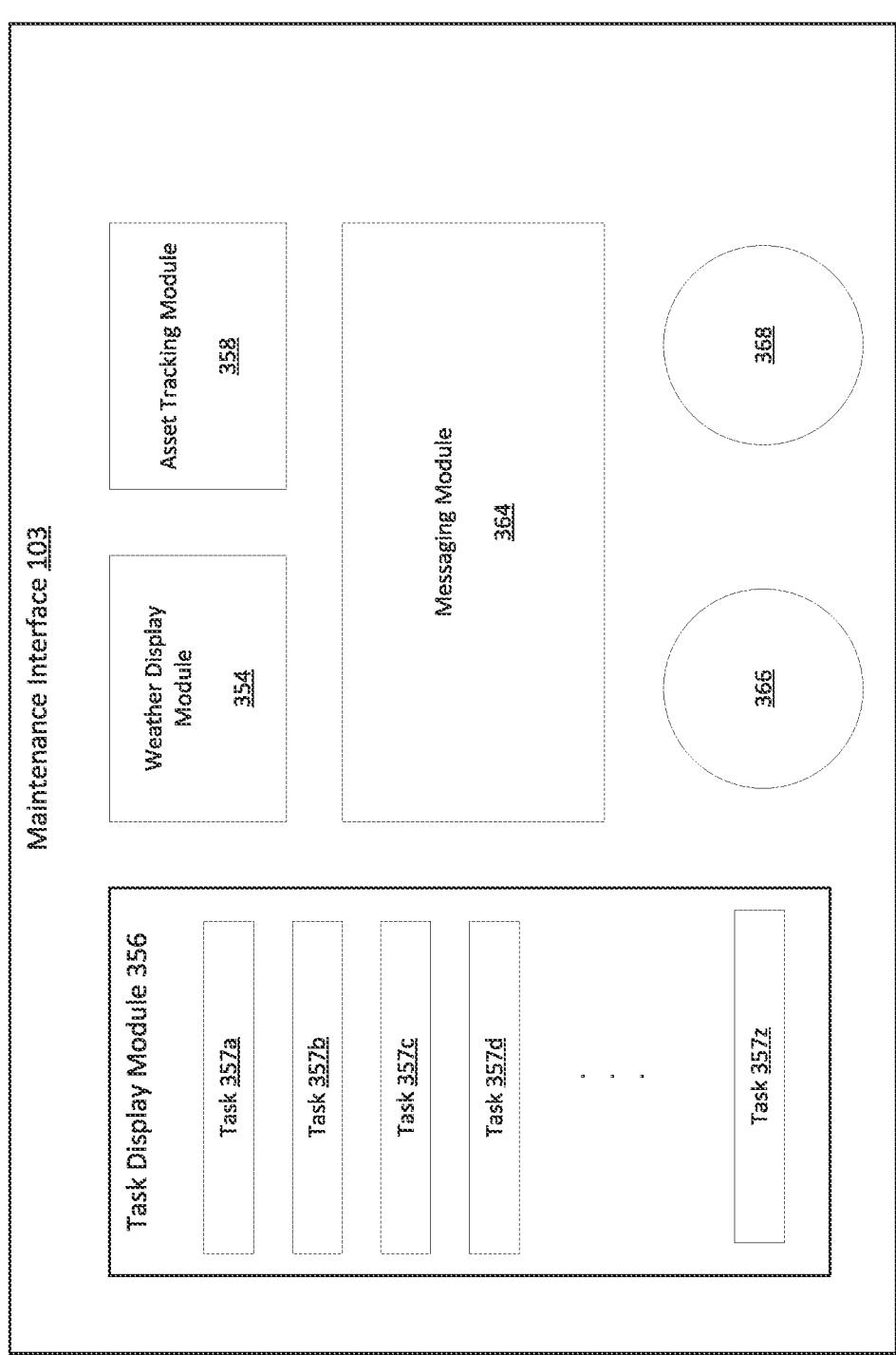
FIG. 3 is a schematic diagram of an example maintenance interface.

FIG. 3 is a schematic diagram of the maintenance interface 103. As described above, the maintenance interface 103 is generated by the turf maintenance system 100 as a dashboard display screen to notify a maintenance person 14 of their assigned scheduled tasks, and to provide updates on the assigned scheduled tasks. The maintenance interface 103 can be generated on a portable tablet computer or a smartphone used by a maintenance person 14, or a display device 148 mounted to the maintenance equipment 114 (see FIG. 11) that is used by the maintenance personnel 14 while performing a scheduled task.

Referring now to FIG. 3, the maintenance interface 103 includes a task display module 356 where one or more scheduled tasks 357a-357z are listed. The scheduled tasks 357a-357z are sequentially ordered for completion by a maintenance person 14 while working on a turf maintenance job. For example, the scheduled task 357a is listed first in the task display module 356 such that the maintenance person 14 should complete this scheduled task first. After completion of the scheduled task 357a, the maintenance person 14 should begin the scheduled task 357b since it is listed after scheduled task 357a in the task display module 356. In some embodiments, the order of the scheduled tasks 357a-357z is updated in real time based on data acquired from one or more of the weather service system 104, the task management system 106, the asset tracking system 108, the irrigation system 110, and the turf devices 112.

The maintenance person 14 can select a scheduled task 357 in the task display module 356 to expand the scheduled task 357 and view more detailed information. When in the expanded view, the maintenance person 14 can view details of the scheduled task 357 such as the start time, end time, duration, or location of the scheduled task 357, the maintenance equipment 114 that should be used to perform the scheduled task 357, and any special instructions that should be followed for completion of the scheduled task 357. Additionally, the maintenance person 14 can mark the scheduled task 357 in the task display module 356 as "in process" when the maintenance person 14 begins to perform the scheduled task 357, and can mark the scheduled task 357 as "completed" when the scheduled task 357 has been completed.

In certain embodiments, the maintenance person 14 cannot modify the scheduled tasks 357. Instead, the scheduled tasks 357 are adjusted by the site supervisor 12 using the control interface 102 or are automatically adjusted by the turf maintenance system 100 based on the data from one or more of the weather service system 104, task management system 106, asset tracking system 108, irrigation system 110, and turf devices 112.

The maintenance interface 103 includes a messaging module 364 that enables the maintenance person 14 to receive messages from the site supervisor 12. In certain embodiments, the messaging module 364 enables the maintenance person 14 to send messages to the site supervisor 12 such as to convey information relating to the conditions of a given area within the turf site 10 such as observations by the maintenance person 14 that are not identifiable from the data acquired from the weather service system 104, task management system 106, asset tracking system 108, irrigation system 110, and turf devices 112. For example, the maintenance person 14 can identify a condition of an area on the turf site 10 that requires attention such as a diseased tree, a dead spot, downed tree branch, and the like. Thus, the messaging module 364 can enhance the collection of relevant observational data in addition to the sensor data described above. Additionally, the messaging module 364 enables the maintenance person 14 to send messages to the site supervisor 12 such as to convey the inability to complete a scheduled task 357 on time or the need to repair or refuel the maintenance equipment 114.

The maintenance interface 103 can further include a locator button 366. When the locator button 366 is tapped by a maintenance person 14, the turf maintenance system 100 automatically determines and marks the location of the maintenance person 14. This can be advantageous when the maintenance person 14 identifies a condition of the turf site 10 requiring attention (e.g., a diseased tree, a dead spot, downed tree branch, etc.) such that the location on the turf site 10 that requires attention is identified by the turf maintenance system 100 via the marked location of the maintenance person 14. In some examples, the location is marked as a set of GPS coordinates.

In certain embodiments, the maintenance interface 103 includes a weather display module 354 similar to the one described above in the control interface 102. The weather display module 354 enables the maintenance person 14 to view the current and predicted future weather conditions for the turf site 10 while performing a scheduled task 357.

In certain embodiments, the maintenance interface 103 includes an asset tracking module 358. Advantageously, when a particular maintenance equipment 114 is assigned for a scheduled task 357, the maintenance person 14 can use the asset tracking module 358 to identify the location of the maintenance equipment 114 within the turf site 10. Additionally, the asset tracking module 358 can enable the maintenance person 14 to enter requested time off (such as vacation or personal days) for approval by the site supervisor 12.

While the example maintenance interface 103 as shown in FIG. 3 does not include an irrigation control module or a sensor control module, in certain embodiments the maintenance interface 103 can include these modules to enable the maintenance person 14 to control the sprinklers 116 and turf devices 112. Alternatively, the maintenance interface 103 can be provided without an irrigation control module or a sensor control module such that the maintenance person 14 is prohibited from controlling the operation of the sprinklers 116 and turf devices 112. Instead, the control of the sprinklers 116 and turf devices 112 is reserved for the site supervisor 12 who uses the control interface 102 to control these devices.

Figure 4:
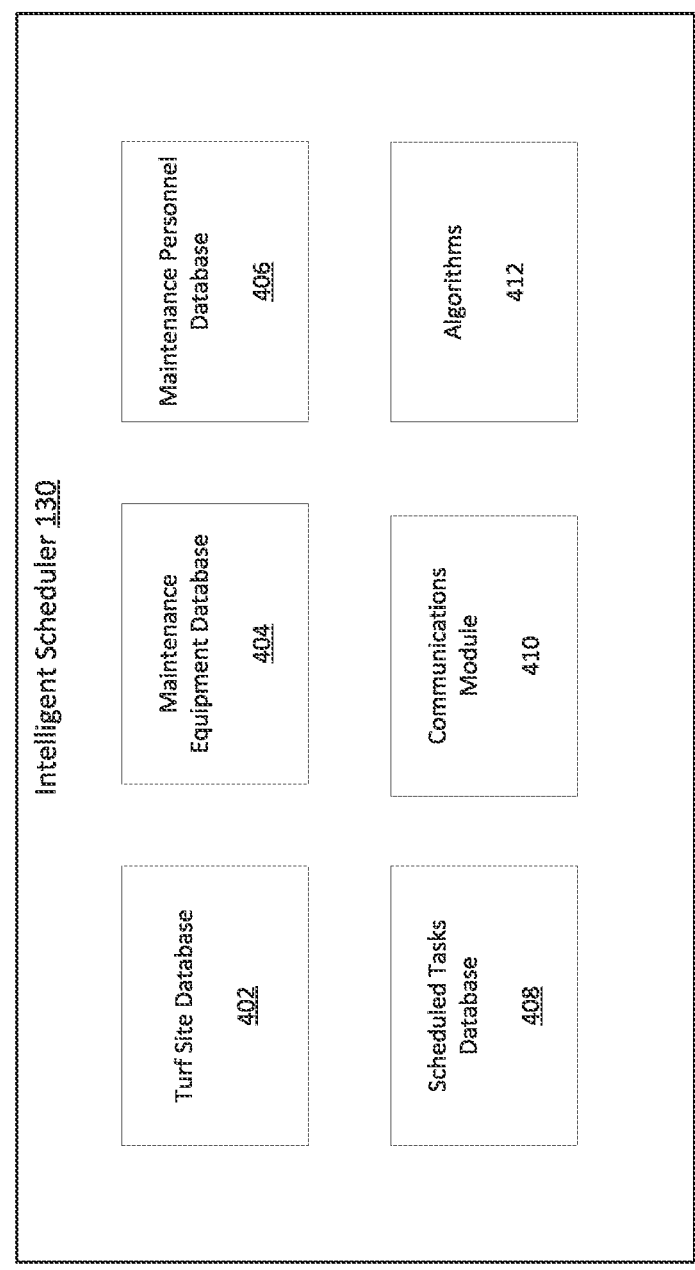
FIG. 4 is a schematic diagram of an example intelligent scheduler.

FIG. 4 is a schematic diagram of an example of the intelligent scheduler 130 of FIG. 1. The intelligent scheduler 130 can share components with the turf maintenance analytics engine 132 which is described in more detail below with reference to FIG. 5. The intelligent scheduler 130 includes a turf site database 402 that stores data on the various areas and features within the turf site 10. In the case of a golf course, the turf site database 402 can store information such as the location of the teeing area, fairway, putting green, rough and other hazards for each hole. The locations of these areas are stored as GPS coordinates in the turf site database 402.

The intelligent scheduler 130 includes a maintenance equipment database 404 that stores data on the maintenance equipment 114 used to complete the scheduled tasks. In some examples, the product serial number for each maintenance equipment 114 and a status of the maintenance equipment 114 is stored in the maintenance equipment database 404. The status of the maintenance equipment 114 may relate to the availability of the maintenance equipment to perform a scheduled such as whether the maintenance equipment 114 is currently being used, is undergoing repairs, is being refueled, or is otherwise offline or unavailable.

In certain embodiments, the maintenance equipment database 404 stores additional data such as the amount of usage, repairs, and amount of fuel consumed by each maintenance equipment 114. For example, fuel consumption can be monitored for each piece of maintenance equipment 114 during performance of tasks such that a comparison of the fuel economy between the various pieces of maintenance equipment 114 can be performed, an estimated fuel consumption for a piece of maintenance equipment 114 to complete a task can be determined, and a notification can be sent to the site supervisor 12 or maintenance person 14 that identifies the need to add fuel to a piece of maintenance equipment 114 before performance of a task is begun based on the current fuel level of the maintenance equipment 114 and the estimated fuel consumption for the maintenance equipment 114 needed to complete the task.

The intelligent scheduler 130 includes a maintenance personnel database 406 that stores data on the maintenance personnel 14. In certain embodiments, an employee ID for each maintenance person 14 and a status of each maintenance person 14 is stored in the maintenance personnel database 406. The status of a maintenance person 14 may relate to the availability of the maintenance person to perform a scheduled such as whether the maintenance person 14 is presently occupied because he or she is currently performing another scheduled task, or whether the maintenance person 14 is out on vacation or sick leave, or is otherwise unavailable.

The status of a maintenance person 14 may also include identification of whether the maintenance person has been trained or certified to operate certain maintenance equipment 114. This ensures that the intelligent scheduler 130 does not assign a scheduled task to a maintenance person 14 that requires the maintenance person to use a piece of maintenance equipment that the person is not trained or certified to use. Advantageously, this can improve safety and reduce occupational hazards during the performance of a turf maintenance job on the turf site 10.

The intelligent scheduler 130 includes a scheduled tasks database 408 that stores data on the scheduled tasks for completion of a turf maintenance job. Data such as the start time, finish time, and duration for each scheduled task are stored in the scheduled tasks database 408.

The intelligent scheduler 130 further includes a communications module 410 that enables the intelligent scheduler 130 to receive data from one or more of the one or more of the weather service system 104, task management system 106, asset tracking system 108, irrigation system 110, and one or more turf devices 112 installed at the turf site 10.

The intelligent scheduler 130 includes one or more algorithms 412 that receive data from the turf site database 402, maintenance equipment database 404, maintenance personnel database 406, scheduled tasks database 408, and communications module 410 as inputs. The algorithms 412 generate as outputs an assignment of maintenance personnel 14 and maintenance equipment 114 for completion of a scheduled task within a turf maintenance job, and automatic adjustments of the scheduled tasks based on the data from one or more of the one or more of the weather service system 104, task management system 106, asset tracking system 108, irrigation system 110, and one or more turf devices 112 installed at the turf site 10.

In certain embodiments, the intelligent scheduler 130 automatically adjusts the scheduling of tasks based on data from the weather service system 104. For example, the algorithms 412 can include rules to automatically trigger instructions and scheduling adjustments based on the weather data from the weather service system 104. Advantageously, the algorithms 412 can optimize the scheduled tasks so that they continue to be performed for as long as possible before the adverse weather conditions arrive at the turf site 10, and so that the scheduled tasks are immediately re-started once the adverse weather conditions have passed.

As an example, when certain weather conditions such as lightning are detected by the weather service system 104 as approaching the turf site 10, the intelligent scheduler 130 can notify the site supervisor 12 and/or maintenance personnel 14 with an alert that can be generated on the control and maintenance interfaces 102, 103. As another example, when certain weather conditions are detected by the weather service system 104 as being a predetermined distance or time away from the turf site 10, the intelligent scheduler 130 can automatically generate an alert on the maintenance interface 103 to instruct the maintenance personnel 14 to return to the garage, or alternatively, in the case of autonomous machines such as autonomous mowers, can instruct the autonomous machines to return to the garage.

The alerts generated on the control and maintenance interfaces 102, 103 can have various levels of severity. For example, a first phase of alert (e.g., a green alert) can notify the site supervisor 12 and maintenance personnel 14 that there is a possibility for rain at the location of the turf site 10, a second phase of alert (e.g., a yellow alert) can notify the site supervisor 12 and maintenance personnel 14 that there is a high likelihood for rain and that the scheduled tasks should be delayed, and a third phase of alert (e.g., a red alert) can notify the site supervisor 12 and maintenance personnel 14 that rain is immediate and that all maintenance personnel 14 and maintenance equipment 114 are required to return to the garage immediately. In some instances, when a red alert is generated, the intelligent scheduler 130 can take control over the maintenance equipment 114 to return the equipment to the garage by remote control.

As another example, a start time for mowing an area within the turf site 10 is adjusted by the intelligent scheduler 130 based on data from the weather service system 104 that indicates a likelihood for rain or lightening in the area. Advantageously, adjusting the start time for the mowing task can avoid a mowing an area of the turf site during adverse weather conditions. In the case of autonomous mowers, the intelligent scheduler 130 can schedule an earlier start time for mowing when the weather service system 104 predicts a likelihood for rain later in the day.

As another example, a start time for irrigating an area within the turf site 10 is adjusted by the intelligent scheduler 130 based on data from the weather service system 104 that indicates a likelihood for rain in the area. Advantageously, adjusting the start time for the irrigation task prevents the area from receiving excessive watering and conserves water use.

In certain embodiments, the intelligent scheduler 130 improves the cooperation and scheduling of tasks between the maintenance equipment 114 and the irrigation system 110. For example, the intelligent scheduler 130 can generate an automated schedule change based on the data from one or more of the one or more of the weather service system 104, task management system 106, asset tracking system 108, irrigation system 110, and one or more turf devices 112.

As an illustrative example, a start time for mowing an area within the turf site 10 is adjusted by the intelligent scheduler 130 based on data from the irrigation system 110 that indicates that the area is being irrigated. Advantageously, adjusting the start time avoids a maintenance person 14 from mowing the area while the area is being irrigated.

As another illustrative example, a start time for irrigating an area within the turf site 10 is adjusted by the intelligent scheduler 130 based on data from the asset tracking system 108 that indicates that maintenance equipment 114 is being operated in the area. Adjusting the start time avoids irrigating the area while maintenance equipment 114 is being operated in the area.

In certain embodiments, the scheduled tasks are performed by autonomous machines such as, for example, autonomous mowers. Advantageously, the intelligent scheduler 130 can synchronize the autonomous mowers with the irrigation system 110 such that the autonomous mowers can operate at nighttime without interference from the irrigation system 110 which allows both mowing and irrigation tasks to be completed after hours. Advantageously, the coordination between the autonomous mowers and irrigation system 110 allows nighttime mowing and irrigation to occur concurrently, not consecutively.

Additionally, the intelligent scheduler 130 can improve the scheduling of tasks to reduce interreference with users and patrons of the turf site 10. In the context of a golf course, the intelligent scheduler 130 can monitor the locations of golfers and avoid scheduling tasks in areas of the golf course that are being played by the golfers. As an illustrative example, when a golfer is determined to be playing a certain hole, a start time for mowing the fairway of that hole is delayed by the intelligent scheduler 130 until after the golfer finishes playing the hole, and it is determined that there are no nearby golfers who will begin to play the hole such that mowing the fairway of the hole will not interfere with the play of the golfers. Advantageously, this allows scheduled tasks such as mowing to be completed during hours of operation of the turf site 10.

Figure 6:
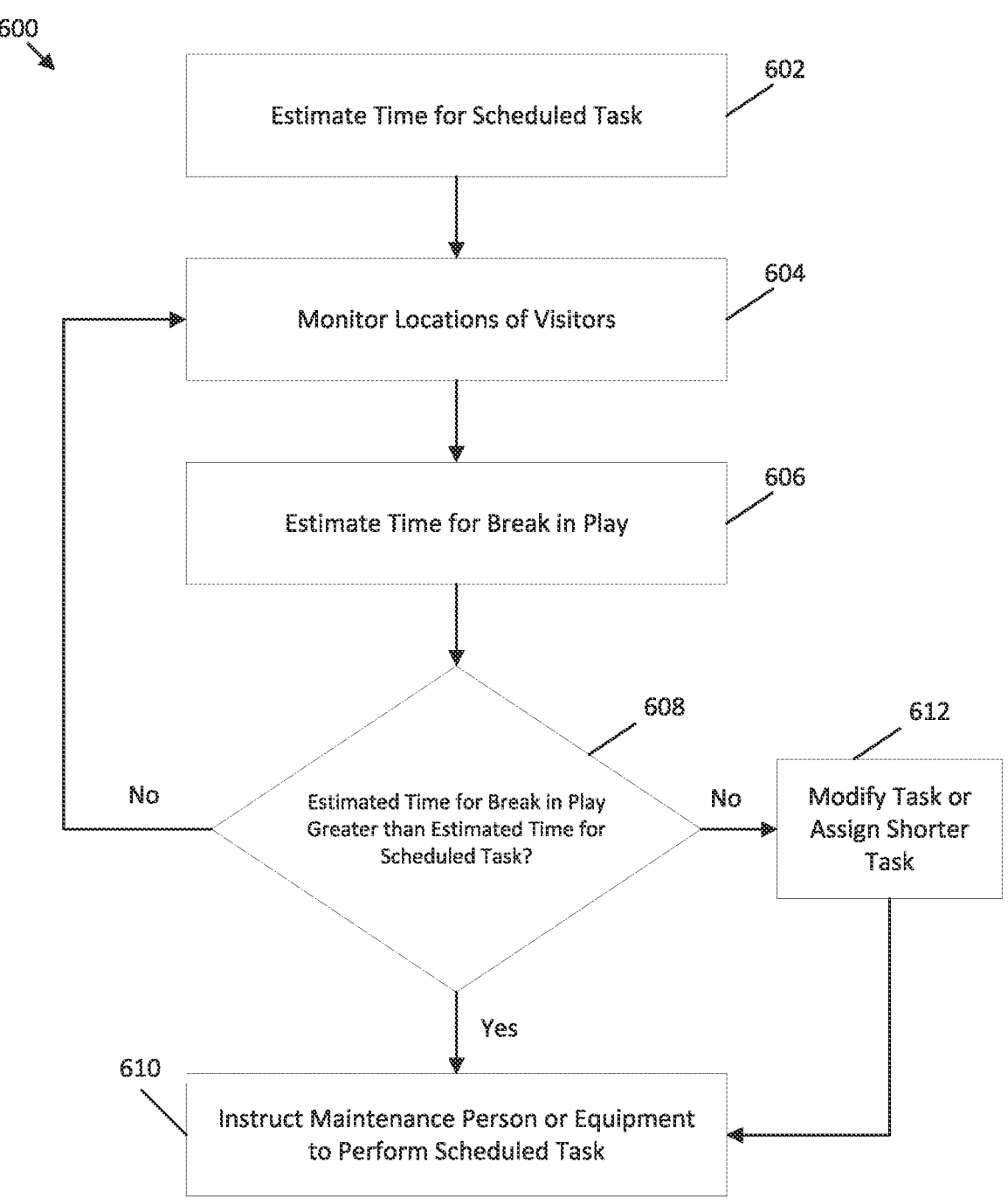
FIG. 6 illustrates a method for determining breaks in play to permit a scheduled task to be completed in an area of the golf course.

FIG. 6 illustrates a method 600 for determining breaks in play to permit a scheduled task to be completed in an area of the turf site 10. A break in play may cover any reduction in activity for a geographic area. A scheduled task performed during a break in play may include, without limitation, applying fertilizer, irrigating, mowing, running a blower or vacuum to clear leaves, trimming, and the like. While the method 600 is described below with reference to a golf course, the method 600 can be applied to manage a variety of turf sites including ball playing fields such as baseball fields, football fields, and soccer fields, and recreational parks, gardens, lawns, and the like, and can be used to track all visitors, players, spectators, and maintenance personnel.

The method 600 includes an operation 602 of estimating a time needed for completion of the scheduled task. As an illustrative example, the scheduled task may require 15 minutes, 30 minutes, or more than 1 hour depending on its complexity.

The method 600 includes an operation 604 of monitoring the locations of visitors on the turf site such as golfers on a golf course. In certain embodiments, the location trackers 120 are placed on activity equipment used by the visitors (e.g., golf carts or golf bags used by golfers on a golf course) to monitor the location of the site visitors. In some embodiments, images obtained by the drones 123 are used to monitor the locations of the site visitors. In further embodiments, cellular data signals are detected to track and monitor the location of the site visitors. Additional location tracking methods for monitoring the locations of the site visitors are possible.

Next, the method 600 includes an operation 606 of estimating a time for a break in play for an area of the turf site 10 based on the monitored locations of the site visitors. As an example, the estimated time for a break in play can be determined based on a distance between a group of golfers and an area of a golf course, and the estimated rate of play of the golfers. For example, larger groups of golfers often require more time to finish a hole than smaller groups of golfers.

Next the method 600 includes an operation 608 of determining whether the estimated time for the break in play is greater than the estimated time to complete the scheduled task. When the estimated time for the break in play is greater than the estimated amount of time to complete the scheduled task (i.e., "Yes" at operation 608), the method 600 proceeds to operation 610 by instructing a maintenance person 14 or autonomous equipment to perform the scheduled task during the break in play. When the estimated time for the break in play is not greater than the estimated amount of time to complete the scheduled task (i.e., "No" at operation 608), the method 600 returns to operation 604, and continues to monitor the locations of the site visitors.

In certain embodiments, when the estimated time for the break in play is not greater than the estimated amount of time to complete the scheduled task (i.e., "No" at operation 608), the method 600 includes operation 612 of modifying the scheduled task so that it can be completed within the estimated time for the break in play for the area of the turf site 10, or assigning a shorter task that can be completed within the estimated time for the break in play. Thereafter, the method 600 can proceed to operation 610 to instruct a maintenance person 14 or autonomous equipment to perform the modified or shorter task during the break in play.

Additionally, in certain embodiments, the intelligent scheduler 130 utilizes the algorithms 412 to schedule automated maintenance for the maintenance equipment 114. For example, the intelligent scheduler 130 can use the algorithms 412 to automatically order replacement parts (e.g., order an oil filter) for the maintenance equipment 114 after a predetermined number of hours of operation, to automatically schedule servicing (e.g., an oil change) for the maintenance equipment 114 after a predetermined number of hours of operation, or to automatically schedule tire replacement or rotation after a predetermined number of miles (for example, the location trackers 120 of FIG. 1 can be used to determine the mileage for maintenance equipment 114).

Additionally, in certain embodiments, the intelligent scheduler 130 can automatically detect problems with the maintenance equipment 114, and alert the maintenance person 14 assigned to operate the equipment to return to the garage. For example, intelligent scheduler 130 can monitor the operation and fuel usage of the maintenance equipment 114 (e.g., by using a sensor on the maintenance equipment 114 that detects fuel level) to alert the maintenance person 14 operating the equipment that the fuel is low, and that the equipment should return to the garage for refueling before, during or after the maintenance person 14 completes a scheduled task. The intelligent scheduler 130 can push equipment recall notices to the site supervisor 12, owner of the maintenance equipment 114, or owner of the turf site 10.

In certain embodiments, the maintenance equipment 114 automatically generate and send maintenance alerts on detected maintenance issues to the intelligent scheduler 130. In response, the intelligent scheduler 130 can automatically update the scheduled tasks based on the maintenance alerts from the equipment. For example, the maintenance equipment 114 can have sensors that detect a problem such as overheating, a clogged filter, and the like.

When the intelligent scheduler 130 receives a maintenance alert, the intelligent scheduler 130 automatically alerts a mechanic at the garage to prepare for the return of the maintenance equipment 114 for service, and can identify and communicate the maintenance issue to the mechanic before the maintenance equipment returns to the garage so that the mechanic can order spare parts as needed. Examples of servicing the maintenance equipment 114 can include software/firmware updates, electrical system repairs, and the like. In some instances, certain maintenance issues may require full component replacement from third-party vendors. The intelligent scheduler 130 can also adjust the scheduling of tasks when the maintenance equipment 114 needs to be repaired or taken out of service.

In some embodiments, the controller 115 of the maintenance equipment 114 enables automatic over the air updates for machine firmware and/or software such as by using data wirelessly transmitted via a cellular network or satellite. This can replace the need to send a technician to the turf site 10 to update the machine firmware and software manually via a diagnostic tool that is plugged into the maintenance equipment 114. This can provide real customer valued innovation, an improved value proposition, and cost savings.

The intelligent scheduler 130 can automatically notify the dealer or vendor of the maintenance equipment 114 when the turf site 10 does not include an in-house mechanic, or when the maintenance issue cannot be resolved by the mechanic. The maintenance alert when sent to the dealer can automatically trigger the dealer to send a truck to pick up the maintenance equipment 114 for repair or to send a skilled technician to repair the maintenance equipment 114.

Additionally, the intelligent scheduler 130 can control the operation of the maintenance equipment 114 based on the data received from one or more of the weather service system 104, task management system 106, asset tracking system 108, irrigation system 110, and turf devices 112. For example, the intelligent scheduler 130 can reduce the throttle of a machine such as a mower so that the machine slows down when it is detected that the maintenance person 14 who is operating the machine is moving in a direction away from the location for the scheduled task assigned to the maintenance person 14, or to avoid a dangerous situation such as an area of the turf site 10 that is currently being irrigated by the irrigation system 110.

Additionally, the intelligent scheduler 130 can generate automated schedule changes and adjust the task schedules based on inputs received from the maintenance personnel 14 while performing a turf maintenance job. The inputs from the maintenance personnel 14 can be received via the messaging module 364 of the maintenance interface 103.

Figure 7:
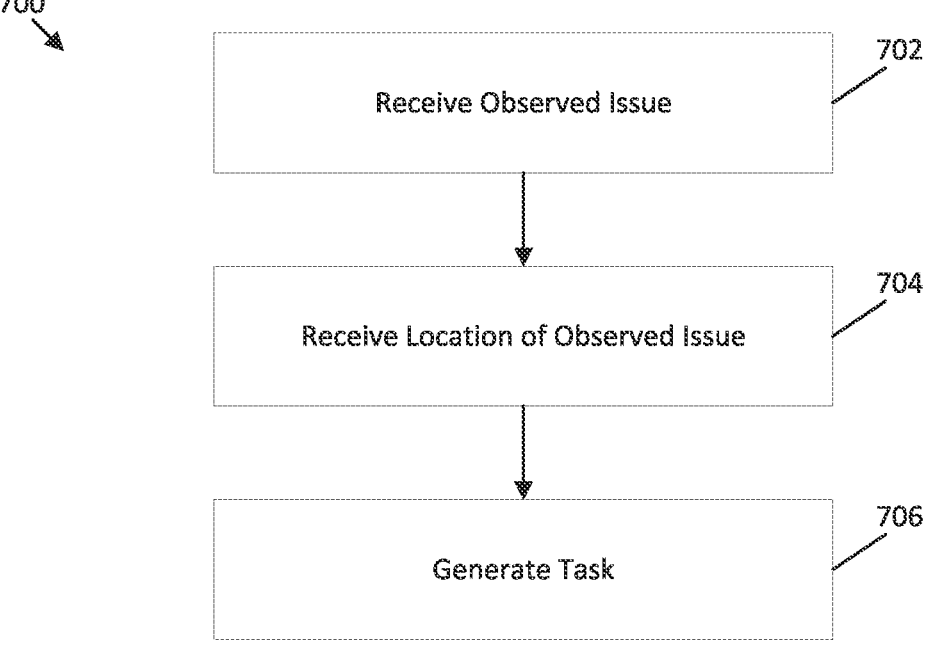
FIG. 7 illustrates a method for adjusting scheduled tasks based on inputs received from maintenance personnel.

FIG. 7 illustrates a method 700 for generating scheduled tasks based on inputs received from the maintenance personnel 14 while performing a turf maintenance job. The method 700 can automatically generate scheduled tasks when a maintenance person 14 observes a turf-related issue in an area of the turf site 10. The turf-related issue can include a hot spot, a wet spot, a bunker repair, weeds, an infestation, fungus, disease, and the like. The turf-related issue can be observed by the maintenance person 14 through their senses such as vision, hearing, touch, or smell, and in some instances the turf-related issue is undetectable by a turf sensor.

The method 700 includes an operation 702 of receiving a message from the maintenance interface 103 that identifies a turf-related issue observed by the maintenance person 14. The maintenance person 14 can type the observed issue into the messaging module 364 of the maintenance interface 103 to generate the message. Alternatively, the maintenance person 14 can select the observed issue from a menu provided on the maintenance interface 103 to generate the message. For example, a drop-down menu can include a list of turf-related issues for selection on the maintenance interface 103. In certain embodiments, the maintenance person 14 can take a photograph of the turf-related issue using a camera of the display device 148 used by the maintenance person, such as the digital camera of a portable tablet computer or a smartphone, and the photograph is included in the message that identifies the turf-related issue.

Next, the method 700 includes an operation 704 of receiving a location of the observed turf-related issue from the maintenance interface 103. In some embodiments, the maintenance person 14 can tap a locator button 366 on the maintenance interface 103 (see FIG. 3) to trigger the turf maintenance system 100 to mark the location of the maintenance person 14.

In some embodiments, a message is received from the maintenance person 14 that includes the observed issue and the location of the maintenance person 14. The message can be sent from the display device 148 utilized by the maintenance person 14 such as a portable tablet computer or a smartphone, or a display device mounted to the maintenance equipment 114 used by the maintenance personnel 14. In some embodiments, the message is sent through a wireless cellular network. In some embodiments, the message is received by the display device utilized by the site supervisor 12 such that the site supervisor is notified about the observed issue.

Next, the method 700 includes an operation 706 of generating a task based on the observed issue and location. In certain embodiments, the intelligent scheduler 130 automatically schedules the task to treat the observed issue such as by automatically scheduling a new task to apply a fungicide when the issue observed by the maintenance personnel 14 is a fungus.

In certain embodiments, the task is scheduled by the intelligent scheduler 130 only after confirmation is received from the control interface 102 such that the site supervisor 12 has an opportunity to determine whether the observed issue is worth treating or can be ignored.

In some embodiments, the intelligent scheduler 130 automatically schedules new tasks or adjusts already scheduled tasks based on inputs received directly from the maintenance equipment 114. For example, the maintenance equipment 114 can scan an area of the turf site 10 to identify possible issues such as hot spots, wet spots, bunker repair, weeds, infestation, fungus, disease, and the like. When an issue is detected from the scan, the maintenance equipment 114 generates and sends a message to the intelligent scheduler 130 with the location and the type of issue identified from the scan. In certain embodiments, the scans conducted by the maintenance equipment 114 includes NDVI images, color images, thermal images, and the like.

In some embodiments, scans are performed by the drone and equipment mounted sensors 122. In some embodiments, the in-ground sensors 118 and microclimate sensors 124 can be used to validate and/or provide further analysis of the data and issues detected by the maintenance personnel 14, maintenance equipment 114, and drones 123.

Figure 5:
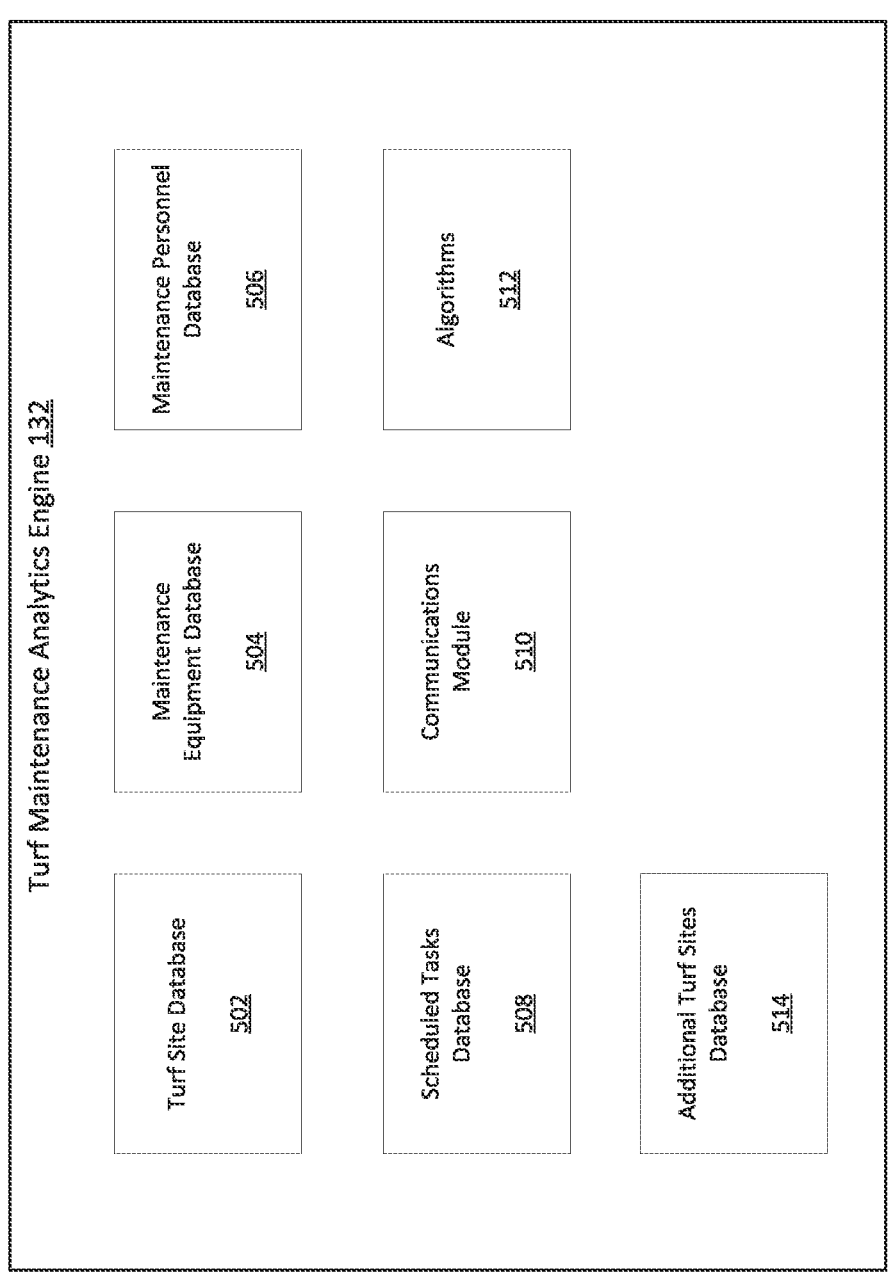
FIG. 5 is a schematic diagram of an example turf maintenance analytics engine.

FIG. 5 is a schematic diagram of an example of the turf maintenance analytics engine 132 of FIG. 1. In certain embodiments, the turf maintenance analytics engine 132 shares components with the intelligent scheduler 130. The turf maintenance analytics engine 132 includes a turf site database 502 that stores data on the various areas and features within the turf site 10. In certain embodiments, the turf site database 502 is shared with the intelligent scheduler 130 such that the turf site databases 402, 502 are the same database utilized by both the turf maintenance analytics engine 132 and the intelligent scheduler 130 to perform their assigned functions. In certain embodiments, the turf site database 502 stores additional data such as the historical conditions of the various areas and features within the turf site 10.

The turf maintenance analytics engine 132 includes a maintenance equipment database 504 that stores data on the maintenance equipment 114 used to complete the scheduled tasks. In certain embodiments, the maintenance equipment database 504 is shared with the intelligent scheduler 130 such that the maintenance equipment databases 404, 504 are the same database. In alternative embodiments, the maintenance equipment databases 404, 504 are distinct databases.

The turf maintenance analytics engine 132 further includes a maintenance personnel database 506 that stores data on the maintenance personnel 14. In certain embodiments, the maintenance personnel database 506 is shared with the intelligent scheduler 130 such that the maintenance personnel databases 406, 506 are the same database. In alternative embodiments, the maintenance personnel databases 406, 506 are distinct databases. In certain embodiments, the maintenance personnel database 506 stores additional data on the scheduled tasks completed by each maintenance person 14, such as observational data that quantifies the quality of the work done for the scheduled tasks completed by the maintenance person 14, and whether the maintenance person 14 completed the scheduled tasks on time and under budget.

The turf maintenance analytics engine 132 includes a scheduled tasks database 508 that stores data on the completed scheduled tasks over time. Data such as the start time, finish time, duration, and the maintenance personnel 14 and maintenance equipment 114 that were used to complete each scheduled task can be stored in the scheduled tasks database 508. In certain embodiments, the scheduled tasks database 508 is shared with the intelligent scheduler 130 such that the scheduled tasks databases 408, 508 are the same database. In alternative embodiments, the scheduled tasks databases 408, 508 are distinct databases.

The turf maintenance analytics engine 132 further includes a communications module 510 that enables the turf maintenance analytics engine 132 to receive data from one or more of the one or more of the weather service system 104, task management system 106, asset tracking system 108, irrigation system 110, and one or more turf devices 112 installed at the turf site 10. In certain embodiments, the communications module 510 is shared with the intelligent scheduler 130 such that the communications modules 410, 510 are the same device. In alternative embodiments, the communications modules 410, 510 are distinct devices.

The turf maintenance analytics engine 132 includes one or more algorithms 512 that receive data from the turf site database 502, maintenance equipment database 504, maintenance personnel database 506, and scheduled tasks database 508 as inputs. The algorithms 512 generate as outputs an estimated efficiency of a turf maintenance job, and proposals for improving the efficiency of the turf maintenance job.

In certain embodiments, the algorithms 512 analyze the scheduled tasks that have been completed to identify certain areas or features of the turf site 10 that require more maintenance than others, and propose ways to reduce the amount of maintenance for those areas. For example, in the case of a golf course, the algorithms 512 can identify a particular hazard that requires more maintenance than other hazards and areas of the golf course. In certain embodiments, the turf maintenance analytics engine 132 can provide a proposal to redesign the hazard to reduce the overall maintenance complexity and cost for the golf course.

Advantageously, the in-ground sensors 118, location trackers 120, drone and equipment mounted sensors 122, and microclimate sensors 124 provide higher granularity and detailed data for tracking the actual maintenance cost to maintain each feature in the turf site 10. For example, in the case of a golf course, the algorithms 512 can calculate a cost estimate per bunker.

In certain embodiments, the algorithms 512 can calculate and monitor the efficiency of the various maintenance personnel 14 who work at the turf site 10. For example, the algorithms 512 can quantify and compare the efficiency of each maintenance person 14. The turf maintenance analytics engine 132 can provide training suggestions to improve the efficiency of certain maintenance personnel 14 who are inefficient and/or performing poorly.

Additionally, the algorithms 512 can calculate and monitor the efficiency of the maintenance equipment 114 used to perform the tasks at the turf site 10. For example, the algorithms 512 can quantify and compare the efficiency of a certain machine such as a mower verses another machine such as another type of mower. Also, the algorithms 512 can recommend that a certain machine be purchased for improving the efficiency of the turf maintenance job.

In certain embodiments, the algorithms 512 can use data from the weather service system 104 in combination with data from one or more of the turf site database 502, maintenance equipment database 504, maintenance personnel database 506, and scheduled tasks database 508 to determine which maintenance equipment 114 performs most efficiently under certain weather conditions. For example, the algorithms 512 can determine that a certain machine such as first type of mower is more efficient than a second type of mower under rain conditions. Conversely, the algorithms 512 can determine that the second type of mower is more efficient than the first type of mower under dry conditions. This information can be transferred to the intelligent scheduler 130 such that the intelligent scheduler 130 assigns the most efficient machine for a scheduled task under weather conditions determined by the weather service system 104.

Additionally, the algorithms 512 can determine that a certain maintenance person 14 is more efficient than another maintenance person under certain weather conditions. For example, the algorithms 512 can determine that one maintenance person is more efficient than another maintenance person under windy conditions because the maintenance person is larger and better able to withstand wind gusts. This information can be transferred to the intelligent scheduler 130 such that the intelligent scheduler 130 assigns the most efficient maintenance person 14 for a scheduled task under weather conditions determined by the weather service system 104.

In certain embodiments, the algorithms 512 can predict how long a turf maintenance job or a scheduled task within the turf maintenance job will take based on historical performance, and whether a turf maintenance job can be completed on time with currently available resources.

In certain embodiments, the algorithms 512 can generate automated route mapping for improved efficiency. For example, an optimized route for mowing the turf site 10 can be determined by the algorithms 512 based on historical performance.

In further embodiments, the algorithms 512 can be used to identify problems (e.g., chemical sprayer went next to pond just before fish kill), or can be used for process validation to prove that steps were properly performed (e.g., chemical sprayer never went near the pond).

In some embodiments, the algorithms 512 can compare the traffic of a certain area of the turf site 10 (i.e., the number of visitors who traverse the area of the turf site) with the cost to maintain that area of the turf site 10. For example, the algorithms 512 can be used to reallocate resources based on the traffic and cost comparison such that resources are not spent an areas of the turf site 10 that are sparsely trafficked by patrons and users of the site.

In certain embodiments, the turf maintenance analytics engine 132 includes an additional turf sites database 514 that stores data from other turf sites for comparison with the data from the turf site 10. The other turf sites can be managed by the same site supervisor or management company, or can be owned by the same owner. In certain embodiments, the data from the other turf sites is provided as anonymized averages to preserve the data privacy of the other turf sites.

Advantageously, by comparing the data from the turf site 10 with the data from other turf sites, the turf maintenance analytics engine 132 can identify anomalies or areas for improvement in the turf site 10. For example, the turf maintenance analytics engine 132 can identify features of the turf site 10 that experience more maintenance than similar features in other turf sites, and can flag these features as areas for improving the efficiency of managing the turf site 10.

Figure 8:
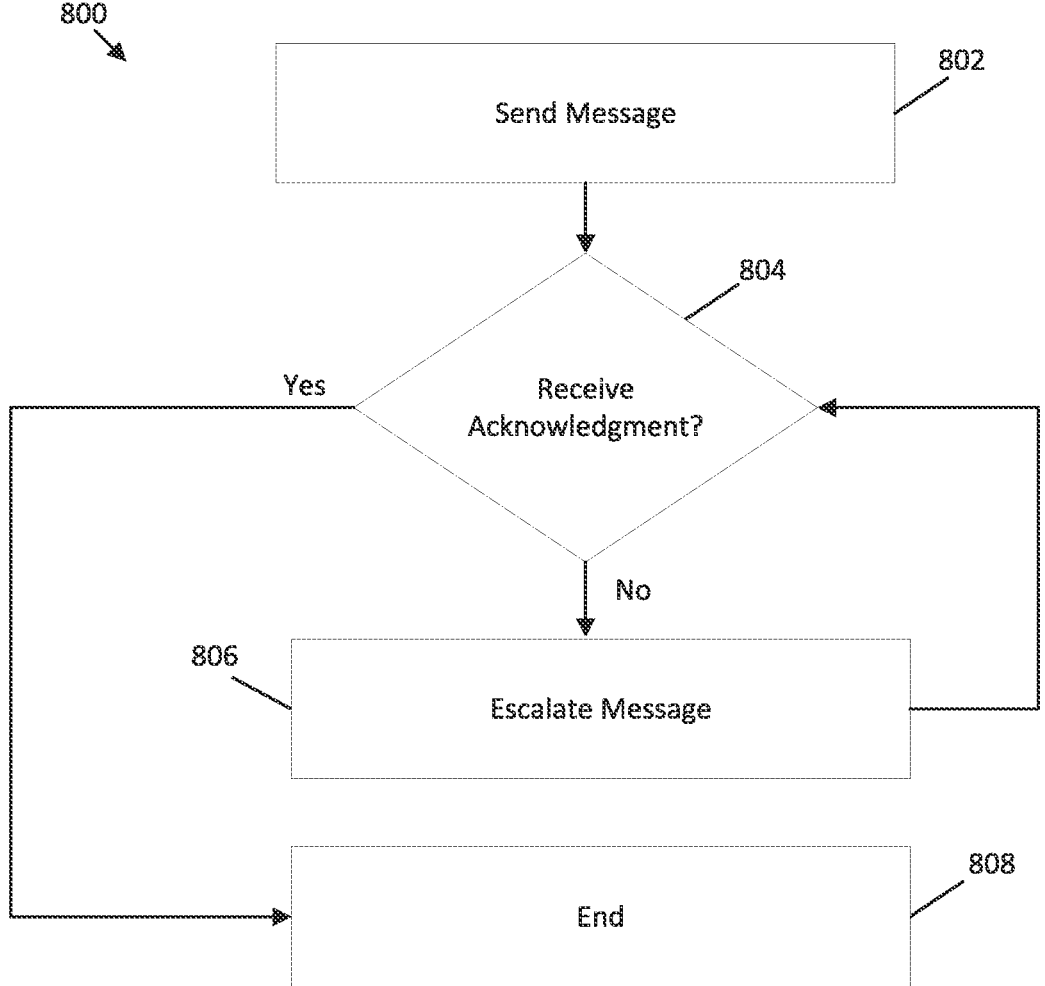
FIG. 8 illustrates a method for enforced maintenance personnel messaging.

FIG. 8 illustrates a method 800 for enforced maintenance personnel messaging. The method 800 is implemented by the turf maintenance system 100 using the control and maintenance interfaces 102, 103 that are described above. The method 800 can improve the cooperation between the site supervisor 12 and the maintenance personnel 14.

The method 800 includes an operation 802 of sending a scheduled task from the control interface 102 operated by the site supervisor 12 to the maintenance interface 103 operated by the maintenance personnel. In certain embodiments, the message is a free-form message that is typed or otherwise created by the site supervisor 12 inside the messaging module 314 of the control interface 102. In alternative embodiments, the message is a pre-defined message that is selected by the site supervisor from a list of pre-defined messages. In some instances, the list of pre-defined messages is provided from a drop-down menu on the control interface 102.

Additionally, in some embodiments, the scheduled task from the control interface 102 is automatically translated for certain maintenance personnel 14. For example, operation 802 can include automatically translating a scheduled task from the site supervisor 12 into Spanish, and then relaying the scheduled task in Spanish to the maintenance person 14.

In some further embodiments, the message is a graphical icon that is representative of a specific action to be taken by the maintenance person 14 such as to stop work or return to garage immediately. As a further example, an icon in the shape of a phone can represent an action such as for the maintenance person 14 to call the site supervisor 12.

In certain embodiments, the scheduled task is sent to a targeted maintenance person 14 such as when the scheduled task is assigned to be performed by the targeted maintenance person 14. In other embodiments, the scheduled task is broadcast to all maintenance personnel 14. In further embodiments, the scheduled task is sent to a subset of the maintenance personnel 14 such as more than one maintenance person 14, but less than all the maintenance personnel 14.

Next, the method 800 includes an operation 804 of determining an acknowledgment of compliance from the maintenance personnel 14. In certain embodiments, the acknowledgment is received by an affirmative confirmation from a maintenance person 14 such as by pressing an acknowledgement button 368 (see FIG. 3) on the maintenance interface 103. In such examples, the control interface 102 receives a confirmation message from a maintenance person 14 that confirms that the maintenance person 14 has viewed the scheduled task and will comply.

Alternatively, the acknowledgement can be inferred or implied from the behavior of the maintenance personnel 14 such that an affirmative confirmation is not required. For example, the scheduled task can be to trim a designated area of the turf site 10, and the location trackers 120 on the maintenance person 14 or maintenance equipment 114 can be used to determine the movement and location of the maintenance person relative to the designated area. When the location trackers 120 determine that the maintenance person 14 is moving to the designated area or that the maintenance person 14 is presently located in the designated area, it can be inferred that the maintenance person 14 has viewed the scheduled task and is complying with it.

As another example, the scheduled task can require a maintenance person 14 to cease work immediately on another task. A sensor on the maintenance equipment 114 can detect whether the maintenance equipment 114 has been turned off by the maintenance person 14. When the sensor determines that the maintenance equipment 114 is turned off, it can be inferred or implied that the maintenance person 14 has viewed the scheduled task and is complying with it. Additional examples of inferred acknowledgement of compliance are possible.

When acknowledgement is received that the maintenance person 14 is complying with the scheduled task (i.e., "Yes" at operation 804), the method 800 ends at operation 808. When acknowledgment is not received, such that the maintenance person 14 is not complying with the scheduled task (i.e., "No" at operation 804), the method 800 proceeds to operation 806 of escalating the scheduled task such as by taking various actions to enforce compliance with the scheduled task and encourage the maintenance person 14 to respond and act accordingly.

Examples of escalating the scheduled task include sending another message with the scheduled task having a higher priority or severity, sending a warning to the maintenance person 14 of non-compliance with the scheduled task, or even remotely adjusting the operation of the maintenance equipment 114 that is operated by the maintenance person 14. An example of remotely adjusting the operation of the maintenance equipment 114 can include adjusting the power take-off (PTO) of the maintenance equipment 114 such as by controlling a clutch of the maintenance equipment 114 to disengage an implement (e.g., a blade) from a power source (e.g., the engine) of the maintenance equipment 114. Additionally, remotely adjusting the operation of the maintenance equipment 114 can include downshifting a gear of the equipment, reducing the RPM of the equipment, or even turning off the power of the equipment.

Next, the method 800 returns to operation 804 of determining acknowledgment from the maintenance personnel 14. When acknowledgement is received that the maintenance person 14 is complying with the scheduled task after it has been escalated (i.e., "Yes" at operation 804), the method 800 ends at operation 808. When acknowledgement is not received after the escalation (i.e., "No" at operation 804), the method 800 returns to operation 806 which includes escalating the scheduled task for a second time. Operation 806 may be repeated as many times as necessary before an acknowledgement of compliance is received, and can have an increased severity each time it is repeated until the acknowledgement of compliance is received.

As an illustrative example, a first round of escalation can include sending a warning to the maintenance person 14 of non-compliance with the scheduled task. If acknowledgment of compliance is not received, a second round of escalation can include reducing the RPM of the maintenance equipment 114. If acknowledgment of compliance is not received, a third round of escalation can include further reducing the RPM of the maintenance equipment 114, or in some instances, even turning off the maintenance equipment 114. Safety mechanisms can be used to ensure that the power of the maintenance equipment 114 is not turned off (even after repeated rounds of escalation) when it is determined that the maintenance person 14 is in an area where powering off the maintenance equipment 114 could cause danger or risk of injury. Thus, the escalation of the scheduled task is repeated each time with a higher degree of severity until acknowledgement of compliance with the scheduled task is received.

The method 800 can be used to enforce rules or regulations within the turf site 10. For example, the turf site 10 or an area within the turf site 10 can be geofenced to enforce speeds and other movement parameters for certain maintenance equipment 114 within the area.

Additionally, certain restrictions can be enforced by the method 800 to prevent or allow certain maintenance equipment 114 and other machines (e.g., golf carts) from operating on or traversing certain areas of the turf site 10. For example, notifications can be generated when certain maintenance equipment 114 travels outside of a geofenced boundary.

Also, mowing operational parameters, safe exit points, and transport paths for mowers can be enforced by the method 800. For example, the operation of a mower is allowed only when the height of cut is adjusted on the mower to match a specified height of cut for a given area. Also, the operation of certain maintenance equipment 114 such as mowers can be restricted for maintenance personnel 14 who have not been certified to operate the equipment.

Figure 9:
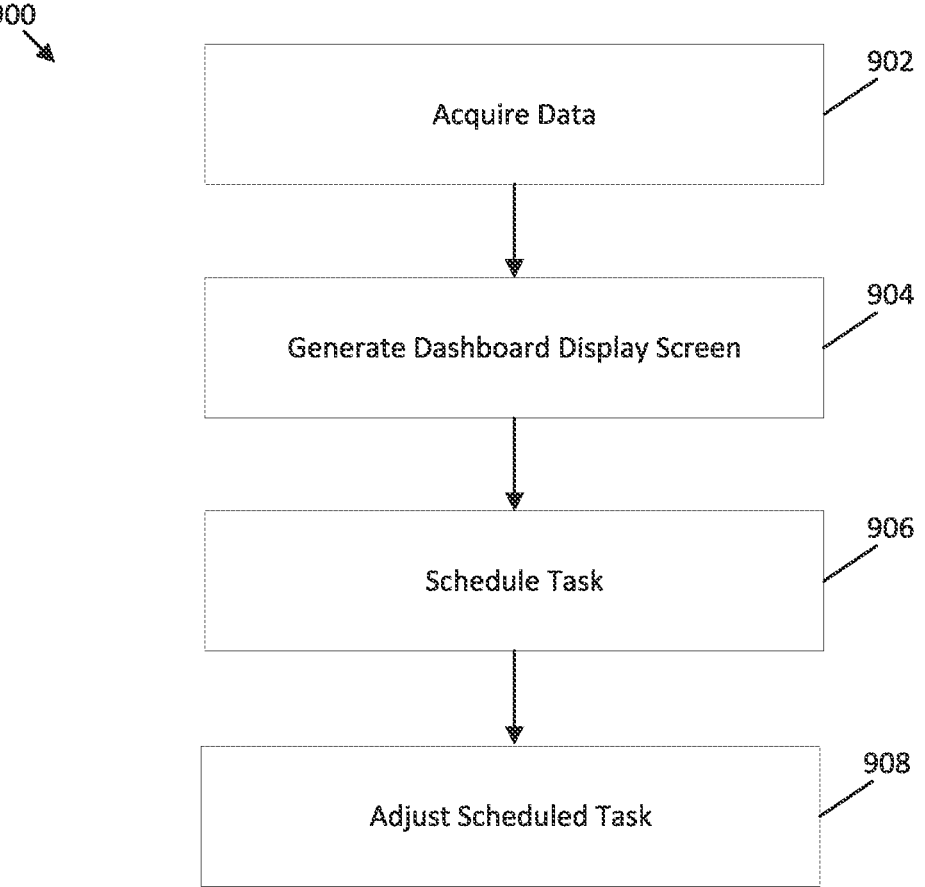
FIG. 9 illustrates a method for turf maintenance.

FIG. 9 illustrates a method 900 for turf maintenance. The method 900 is implemented by the turf maintenance system 100, and includes an operation 902 of acquiring data from one or more of the weather service system 104, the task management system 106, the asset tracking system 108, the irrigation system, and the turf devices 112. As used herein, the term one or more means that operation 902 can include acquiring data from only one of the systems and devices shown in FIG. 1, or alternatively, operation 902 can include acquiring data from two or more of the systems and devices such that data from multiple systems and devices is acquired.

Next, the method 900 includes an operation 904 of generating a dashboard display screen to display the data acquired from one or more of the weather service system 104, the task management system 106, the asset tracking system 108, the irrigation system 110, and the turf devices 112. In some embodiments, the dashboard display screen is the control interface 102 that is used by the site supervisor 12. In some embodiments, the dashboard display screen is the maintenance interface 103 used by the maintenance personnel 14.

Next, the method 900 includes an operation 906 of scheduling at least one task for completing a turf maintenance job based on the data acquired from the weather service system 104, the task management system 106, the asset tracking system 108, the irrigation system 110, and the turf devices 112. As described above, a turf maintenance job can include one or more distinct tasks performed by the maintenance personnel 14 for managing the turf site 10 such as mowing, trimming, removing debris such as leaves and grass cuttings, and so on As an illustrative example, a task is scheduled based on data from the asset tracking system 108 including current or predicted maintenance equipment availability and location data. As another illustrative example, a task is scheduled based on data from the asset tracking system 108 including maintenance personnel work schedules, vacation, and sick leave. As a further illustrative example, a task is scheduled based on data from the irrigation system 110 including irrigation scheduling based on asset tracking, chemical applications, weather, and sensor data. As another illustrative example, a task is scheduled based on data from the weather service system 104 including current or predicted future weather conditions for the turf site 10.

In some embodiments, the method 900 includes an operation 908 of adjusting a start time, an end time, a duration, or a location for a scheduled task based on the data acquired from one or more of the weather service system 104, the task management system 106, the asset tracking system 108, the irrigation system 110, and the turf devices 112.

As an example, when the scheduled task is mowing an area in the turf site 10, a start time for the mowing can be adjusted based on data from the irrigation system 110 that indicates the area is currently being irrigated. As another example, when the scheduled task is irrigating an area in the turf site 10, a start time for the irrigation can be adjusted based on data from the asset tracking system 108 that indicates maintenance equipment 114 is being operated in the area.

As a further example, when the scheduled task is mowing an area within the turf site 10, a start time for the mowing can be adjusted based on data from the weather service system 104 indicating a likelihood for rain in the area. As another example, when the scheduled task is irrigating an area within the turf site 10, a start time for the irrigation can be adjusted based on data from the weather service system 104 indicating a likelihood for rain in the area.

In some embodiments, the adjustment to the scheduled task is displayed in the dashboard display screen generated at operation 904. For example, the maintenance interface 103 can provide updates on the scheduled task to the maintenance personnel 14 based on the data acquired from the weather service system 104, the task management system 106, the asset tracking system 108, the irrigation system 110, and the turf devices 112.

Figure 10:
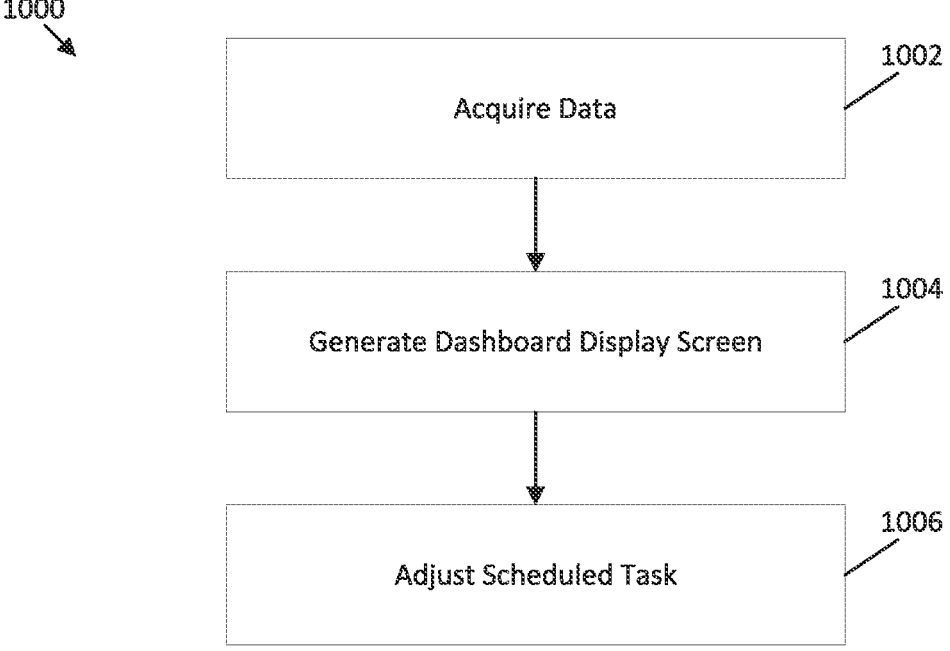
FIG. 10 illustrates another method for turf maintenance.

FIG. 10 illustrates another method 1000 for turf maintenance. The method 1000 is implemented by the turf maintenance system 100, and includes an operation 1002 of acquiring data on an area within the turf site 10 from one or more of the weather service system 104, task management system 106, asset tracking system 108, irrigation system 110, and turf devices 112.

Next, the method 1000 includes an operation 1004 of generating a dashboard display screen to display the data on the area within the turf site 10 that is acquired from the weather service system 104, task management system 106, asset tracking system 108, irrigation system 110, and turf devices 112. In some embodiments, the dashboard display screen is the control interface 102 used by the site supervisor 12. In some embodiments, the dashboard display screen is the maintenance interface 103 used by the maintenance personnel 14.

Next, the method 1000 includes an operation 1006 of adjusting a scheduled task for the area within the turf site 10 based on the acquired data. In some examples, a selection of the maintenance equipment 114 for the scheduled task is adjusted based on the acquired data. In some examples, a duration for the scheduled task is adjusted based on the acquired data. In some examples, an assignment of the maintenance personnel 14 for performing the scheduled task is adjusted based on the acquired data. As an illustrative example, a start time, an end time, or a duration for irrigating the area is adjusted based on the acquired data.

In some embodiments, operation 1006 includes adjusting a scheduled task by identifying an area within the turf site 10 that requires more maintenance than other areas. In some embodiments, operation 1006 further includes providing a solution to reduce the maintenance for an identified by modifying a layout of the area or adjusting scheduled tasks for the area.

In some embodiments, operation 1006 includes adjusting a scheduled task by determining a maintenance cost for an area within the turf site 10 based on the acquired data. By determining which areas within the turf site 10 are more costly to maintain than others, the system 100 allows the site supervisor 12 or the owner of the turf site 10 to adjust the features of the turf site 10 such as one more hazards on a golf course that are costly to maintain.

In further embodiments, operation 1006 includes adjusting a scheduled task by estimating a duration for completion of a turf maintenance job or a duration for a scheduled task based on the acquired data. By estimating a duration for completion of the turf maintenance job or a scheduled task, the site supervisor 12 or owner of the turf site 10 can also adjust the opening and closing times for the turf site 10, or can adjust the use of the turf site 10 by visitors such as the tee-times for a golf course. Also, estimating a duration for completion of the turf maintenance job or a scheduled task allows the site supervisor 12 to know when the maintenance equipment 114 will return to the garage for cleaning, refueling, or maintenance.

In some embodiments, operation 1006 includes adjusting a scheduled task by determining whether the turf maintenance job can be completed on time based on the acquired data. When it is determined that the turf maintenance job cannot be completed on time, the system 100 can automatically order or schedule additional resources such as additional maintenance personnel 14 or maintenance equipment 114 to work on completing the turf maintenance job.

In some embodiments, operation 1006 includes adjusting a scheduled task by generating an automated route mapping for assets on the turf site 10 based on the acquired data. The assets include the maintenance personnel 14, the maintenance equipment 114, or both. By generating an automated route mapping, the tasks are completed by the assets more efficiently. As another illustrative example, the efficiency of a mowing task is improved by adjusting the direction or pattern of mowing such as between a vertical pattern (i.e., north-to-south), a horizontal pattern (i.e., east-to-west), or a diagonal pattern for certain areas of the turf site 10.

In some embodiments, operation 1006 includes adjusting a scheduled task by anonymizing the acquired data, and comparing the anonymized acquired data between different turf sites. By comparing the anonymized data between different turf sites, the maintenance cost for the turf site 10 can be determined relative to other similar turf sites.

In certain embodiments, scores are generated, and a ranking of turf sites within a portfolio of a multi-site owner, or a regional ranking of turf sites, can be generated to determine the relative cost of the maintaining the turf site 10 compared to peers. In certain examples, an overall score is generated for the turf site 10, or scores for certain areas within the turf site are generated. In further examples, scores for each task performed at the turf site 10 are generated. The generated scores can indicate the total cost of ownership for the turf site 10, the cost of maintaining certain areas within the turf site 10, the cost of operating certain maintenance equipment 114 used on the turf site 10, and the cost of performing certain tasks on the turf site 10. Such costs can be compared to the costs of other turf sites to determine relative costs.

Figure 11:
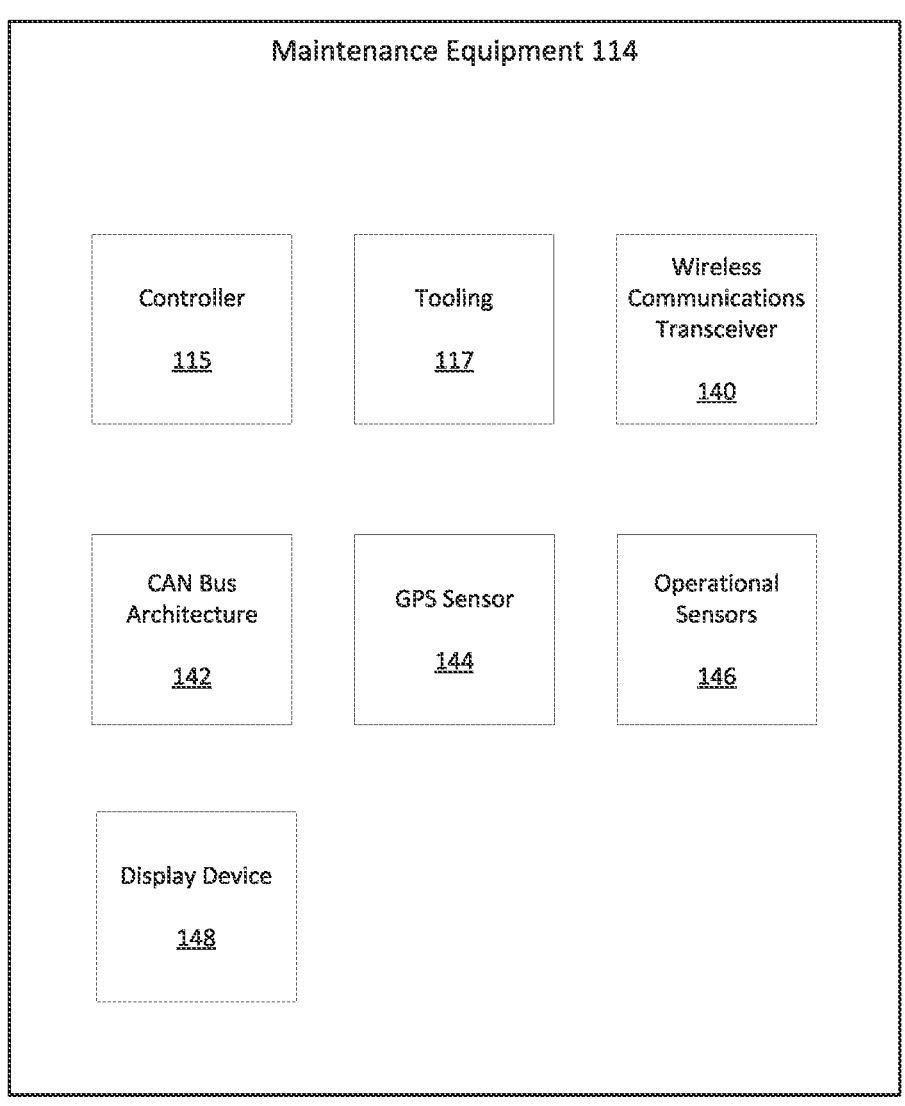
FIG. 11 is a schematic block diagram illustrating the components of an example piece of maintenance equipment.

FIG. 11 is a schematic block diagram illustrating the components of an example piece of maintenance equipment 114 such as a mower or trimmer that can be used to perform one or more scheduled tasks for a turf maintenance job. In some embodiments, the maintenance equipment 114 is autonomous such as an autonomous mower that can operate without human control.

Referring now to FIG. 11, the maintenance equipment 114 includes a controller 115 that controls the operation of a tooling 117 on the maintenance equipment 114. The tooling 117 can include, without limitation, an engine, a power take-off (PTO), a clutch, a drive, a transmission, or an implement such as a blade of a mower or a trimmer.

The maintenance equipment 114 further includes a CAN Bus architecture 142 that can interface with a wireless communications transceiver 140 to receive instructions from the turf maintenance system 100. As described above, in some embodiments, such as when compliance with an instruction is not acknowledged either expressly or by inference (see FIG. 8), the turf maintenance system 100 can remotely adjust the operation of the maintenance equipment 114 such as by adjusting the power take-off (PTO), controlling a clutch to engage or disengage an implement (e.g., a blade) from a power source (e.g., the engine), downshifting a gear of a transmission, reducing or limiting the RPM of the engine, or turning off the engine.

In some embodiments, the CAN Bus architecture 142 can also be used to send messages through the wireless communications transceiver 140 from the maintenance equipment 114 to the turf maintenance system 100 such as observations from a maintenance person 14 while operating the maintenance equipment 114. For example, the method 700 described above can be implemented by using the CAN bus architecture 142 to send and receive messages between the maintenance equipment 114 and the turf maintenance system 100.

In some embodiments, a display device 148 is mounted to the maintenance equipment 114. The display device 148 can be used to display any or all of the components of the maintenance interface 103 at a convenient location for a maintenance person 14 while operating the maintenance equipment 114.

The maintenance equipment 114 further includes a location sensor to monitor and track the location of the equipment at the turf site 10. In some examples, the location sensor is a GPS sensor or a vision sensor that determines location through imaging.

The maintenance equipment 114 also includes one or more operational sensors 146 that monitor the operation of the equipment such as one or more sensors that can detect whether the engine is turned on, the RPM of the engine, the gear of the transmission, and the fuel level of the equipment (such as to determine whether the equipment needs refueling). The one or more operational sensors 146 can also be used to determine whether the equipment is malfunctioning such that it is need of repair. The wireless communications transceiver 140 can send data acquired from the operational sensors 146 to the turf maintenance system 100.

Figure 12:
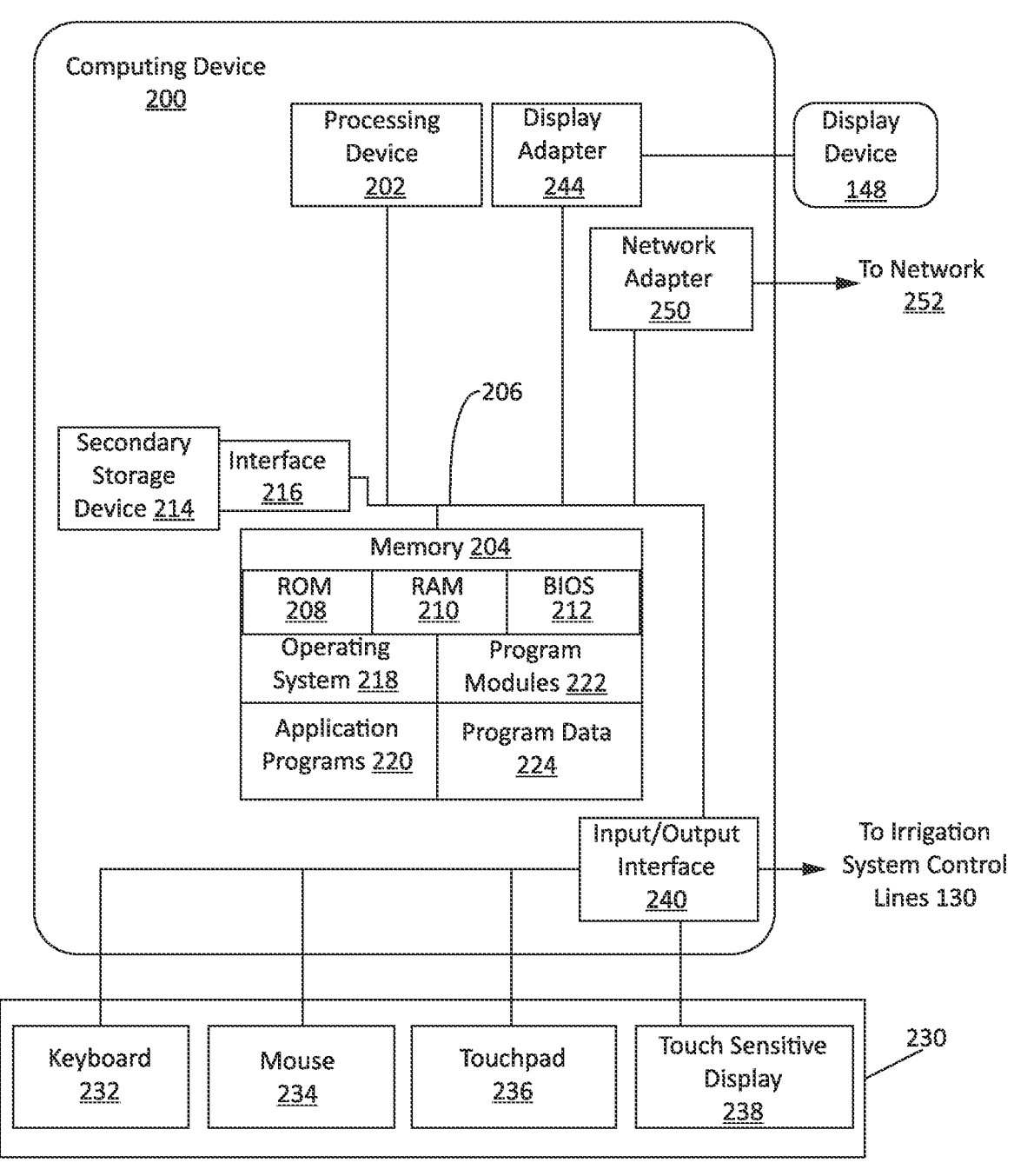
FIG. 12 is a schematic block diagram of an example computing device.

FIG. 12 is a schematic block diagram illustrating an example computing device 200. The computing device 200 includes at least one processing device 202 and at least one memory device 204. The at least one memory device 204 stores software instructions that, when executed by the at least one processing device 202, cause the at least one processing device 202 to perform the methods, operations, computations, and functions described herein.

The memory device 204 can include read-only memory 208 and random-access memory 210. A basic input/output system 212 containing the basic routines that act to transfer information within computing device 200, such as during start up, is stored in read-only memory 208. In certain examples, the memory device 204 can be a part of processing device 202 while in other examples the memory device 204 can be separate from processing device 202.

The computing device 200 includes a system bus 206 that couples various system components including the memory device 204 to the processing device 202. The system bus 206 is one of any number of types of bus structures including a memory bus, or memory controller; a peripheral bus; and a local bus using any of a variety of bus architectures.

In some embodiments, computing device 200 also includes secondary storage devices 214 for storing digital data. An example of a secondary storage device is a hard disk drive. The secondary storage devices 214 are connected to the system bus 206 by secondary storage interface 216. The secondary storage devices 214 and their associated computer readable media provide nonvolatile storage of computer readable instructions (including application programs and program modules), data structures, and other data for computing device 200.

Although a hard disk drive is provided as an example of a secondary storage device, other types of computer readable media can be provided in other embodiments. Examples of these other types of computer readable media include magnetic cassettes, flash memory cards, digital video disks, Bernoulli cartridges, compact disc read only memories, digital versatile disk read only memories, random access memories, read only memories, or other memory devices.

A number of program modules can be stored in the secondary storage devices 214 or memory device 204, including an operating system 218, one or more application programs 220, other program modules 222, and program data 224. In some embodiments, the program modules include data instructions that are stored in computer readable media such as computer readable storage media. The data instructions, when executed by the processing device 202, cause the processing device 202 to perform one or more of the methods or operations described herein.

In some embodiments, a user, such as the site supervisor 12, provides inputs to the computing device 200 through one or more input devices 230. Examples of input devices 230 include a keyboard 232, mouse 234, touchpad 236, and touch sensitive display 238. Other embodiments may include other types of input devices 230. The input devices 230 are connected to the processing device 202 through an input/output interface 240 that is coupled to the system bus 206. The input devices 230 can be connected by any number of input/output interfaces, such as a parallel port, serial port, game port, or a universal serial bus. Wireless communications between the input devices 230 and input/output interface 240 is possible as well, and includes infrared, BLUETOOTH® wireless technology, 802.11a/b/g/n/z wireless communication, cellular communication, or other radio frequency communication systems in some embodiments.

In some embodiments, the display device 148, such as a monitor, liquid crystal display device, or touch screen display device, is connected to the system bus 206 via an interface, such as a display adapter 244. In some embodiments, the display device 148 and touch sensitive display 238 are the same device. In addition to the display device 148, the computing device 200 can include additional peripheral devices (not shown), such as speakers or a printer.

When used in a local area networking environment or a wide area networking environment (such as the Internet), the computing device 200 is typically connected to a network 252 through a network interface or adapter 250. Other possible embodiments can use other communications devices. For example, some embodiments of the computing device 200 can include a modem for communicating across network 252.

The computing device 200 includes at least some form of computer-readable media. The computer readable media can include any available media that can be accessed by the computing device 200. By way of example, the computer-readable media can include computer readable storage media and communication media.

The term computer readable media as used herein includes computer storage media. The computer storage media includes volatile and nonvolatile, removable and non-removable, media implemented in any method or technology for storage of information, such as computer readable instructions, data structures, program modules, or other data. Computer readable storage media includes, but is not limited to, read-only memory 208, random-access memory 210, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 200. In some embodiments, the computer readable storage media is non-transitory media.

Communications media can be embodied by computer readable instructions, data structures, program modules or other data in a modulated data signal, such as a carrier wave or other transport mechanism and includes any information delivery media. The term "modulated data signal" refers to a signal that has one or more of its characteristics set or changed in such a manner as to encode information in the signal. By way of example, communications media includes wired media such as a wired network or direct-wired connection, and wireless media such as acoustic, radio frequency, infrared, and other wireless media. In some embodiments, communications media is transitory media. Combinations of any of the above are also included within the scope of the computer readable media.

The various embodiments described above are provided by way of illustration only and should not be construed to limit the claims attached hereto. Those skilled in the art will readily recognize various modifications and changes that may be made without following the example embodiments and application illustrated and described herein, and without departing from the true spirit and scope of the following claims.

What is claimed is:

1. A turf maintenance system comprising:
maintenance equipment including:
a power source;
a tooling powered by the power source and configured to perform one or more tasks for a turf maintenance job;
a controller that controls operation of the tooling; and
a wireless communications transceiver operatively connected to the controller, the wireless communications transceiver configured to receive instructions over a network to automatically adjust the operation of the tooling without human intervention;
a control device including:
an interface for communicating the instructions over the network to the wireless communications transceiver of the maintenance equipment;
at least one processing device; and
at least one memory device storing software instructions that, when executed by the at least one processing device, cause the at least one processing device to:
acquire data from one or more turf systems;
generate a dashboard display screen to display the data acquired from the one or more turf systems, wherein the dashboard display screen includes a control interface;
schedule at least one task to the maintenance equipment for completing the turf maintenance job based on the data acquired from the one or more turf systems; and
when an acknowledgment of compliance for the at least one task is not received by the control interface, escalate the at least one task to enforce compliance with the at least one task, wherein escalation of the at least one task includes automatically generating the instructions for remotely adjusting the operation of the maintenance equipment without human intervention by at least one of controlling a clutch to disengage the tooling from the power source, downshifting a gear of the power source, and reducing the RPM of the power source.

2. The system of claim 1, wherein the one or more turf systems include a weather service system, a task management system, an asset tracking system, an irrigation system, and turf devices installed at a turf site.

3. The system of claim 2, wherein data acquired from the task management system includes data identifying tasks that are required for completion of the turf maintenance job.

4. The system of claim 2, wherein the turf devices installed at the turf site include sprinklers, in-ground sensors, location trackers, drones, and microclimate sensors.

5. The system of claim 2, wherein the at least one task is scheduled based on data from the asset tracking system including current or predicted maintenance equipment availability and location data, and maintenance personnel work schedules and training certification records for operating certain maintenance equipment.

6. The system of claim 2, wherein the at least one task is scheduled based on data from the irrigation system, the data from the irrigation system including irrigation scheduling based on asset tracking, chemical applications, current and predicted weather conditions, and sensor data.

7. The system of claim 2, wherein the at least one task is scheduled based on data from the weather service system including current and predicted weather conditions.

8. The system of claim 2, wherein the software instructions, when executed by the at least one processing device, cause the system to adjust a start time, an end time, a duration, or a location for the at least one task based on data from one or more of the weather service system, the task management system, the asset tracking system, the irrigation system, and the turf devices.

9. The turf maintenance system of claim 1, wherein the maintenance equipment has one or more sensors that monitor an operational status of the maintenance equipment; and
wherein the control device:
automatically transmits without human intervention the instructions to the maintenance equipment based on the data acquired from the one or more turf systems and the operational status of the maintenance equipment.

10. A turf maintenance system comprising:

maintenance equipment including:

a power source;

a tooling powered by the power source and configured to perform one or more tasks for a turf maintenance job;

a controller that controls operation of the tooling; and a wireless communications transceiver operatively connected to the controller, the wireless communications transceiver configured to receive instructions over a network to automatically adjust the operation of the tooling without human intervention;

a control device including:

an interface for communicating the instructions over the network to the wireless communications transceiver of the maintenance equipment;

at least one processing device; and at least one memory device storing software instructions that, when executed by the at least one processing device, cause the system to:

acquire data on an area within a turf site from one or more of a weather service system, a task management system, an asset tracking system, an irrigation system, and turf devices installed at the turf site;

generate a dashboard display screen to display the data on the area within the turf site acquired from one or more of the weather service system, the task management system, the asset tracking system, the irrigation system, and the devices installed at the turf site, wherein the dashboard display screen includes a control interface;

adjust a scheduled task for the area within the turf site based on the acquired data; and when an acknowledgment of compliance for the scheduled task is not received by the control interface, escalate the scheduled task to enforce compliance with the scheduled task, wherein escalation of the scheduled task includes automatically generating the instructions for remotely adjusting the operation of the maintenance equipment without human intervention by at least one of controlling a clutch to disengage the tooling from the power source, downshifting a gear of the power source, and reducing the RPM of the power source.

11. The system of claim 10, wherein a start time, an end time, or a duration for irrigating the area is adjusted based on the acquired data.

12. The system of claim 10, wherein the scheduled task is adjusted by determining a maintenance cost for the area within the turf site based on the acquired data.

13. The system of claim 10, wherein the scheduled task is adjusted by estimating a duration for completion of the scheduled task based on the acquired data.

14. The system of claim 10, wherein the scheduled task is adjusted by determining whether the turf maintenance job can be completed on time based on the acquired data.

15. The system of claim 10, wherein the scheduled task is adjusted by generating an automated route mapping for assets on the turf site based on the acquired data.

16. The system of claim 10, wherein the scheduled task is adjusted by anonymizing the acquired data, and comparing the anonymized data with data from different turf sites.

17. The system of claim 10, wherein the at least one memory device stores additional software instructions that, when executed by the at least one processing device, further cause the system to quantify and compare maintenance personnel productivity, and recommend training for certain maintenance personnel to increase their productivity.

18. The system of claim 10, wherein the at least one memory device stores additional software instructions that, when executed by the at least one processing device, further cause the system to recommend a selection of maintenance equipment for the scheduled task, a mowing pattern for the scheduled task, training for maintenance personnel to complete the scheduled task, or agronomic practices to improve turf quality after completion of the scheduled task.

* * * * *